US011199609B2

(12) United States Patent
Ochiai et al.

(10) Patent No.: US 11,199,609 B2
(45) Date of Patent: Dec. 14, 2021

(54) RADAR COVER AND METHOD FOR MANUFACTURING RADAR COVER

(71) Applicant: FALTEC Co., Ltd., Kawasaki (JP)

(72) Inventors: Takumi Ochiai, Kawasaki (JP);
Koushirou Oota, Yokohama (JP)

(73) Assignee: FALTEC CO. LTD., Kanagawa (JP)

( * ) Notice: Subject to any disclaimer, the term of this patent is extended or adjusted under 35 U.S.C. 154(b) by 359 days.

(21) Appl. No.: 16/349,497

(22) PCT Filed: Dec. 6, 2017

(86) PCT No.: PCT/JP2017/043783
§ 371 (c)(1),
(2) Date: May 13, 2019

(87) PCT Pub. No.: WO2018/105644
PCT Pub. Date: Jun. 14, 2018

(65) Prior Publication Data
US 2019/0293752 A1    Sep. 26, 2019

(30) Foreign Application Priority Data

Dec. 9, 2016  (JP) .............................. JP2016-239660
Dec. 27, 2016  (JP) .............................. JP2016-252958

(51) Int. Cl.
*G01S 7/03* (2006.01)
*B29C 45/16* (2006.01)
(Continued)

(52) U.S. Cl.
CPC ................ *G01S 7/03* (2013.01); *B29C 45/16* (2013.01); *B60R 13/00* (2013.01); *G01S 13/93* (2013.01); *G01S 13/931* (2013.01); *H01Q 1/42* (2013.01)

(58) Field of Classification Search
CPC ........ G01S 13/931; G01S 2013/93275; H01Q 1/42
See application file for complete search history.

(56) References Cited

U.S. PATENT DOCUMENTS 6,961,023 B2 * 11/2005 Fujii .................... H01Q 1/3258
                                                       343/713
7,508,353 B2 *  3/2009 Shingyoji ............ H01Q 1/3233
                                                       343/909
(Continued)

FOREIGN PATENT DOCUMENTS

EP        3530524 A1    8/2019
JP     2004244516 A    9/2004
(Continued)

OTHER PUBLICATIONS

Extended European Search Report for Application No. 17879406.1 dated Jun. 29, 2020.
(Continued)

*Primary Examiner* — Peter M Bythrow
(74) *Attorney, Agent, or Firm* — Moser Taboada

(57) ABSTRACT

A radar cover includes, a transparent member which has an extension recess recessed toward a front surface side from the back surface, extending along the back surface, and having a paint layer formed on an inner wall surface thereof. The inner wall surface of the extension recess has, a first connection surface disposed on a first side in an orthogonal cross section with respect to an extension direction of the extension recess and connected to the back surface, a second connection surface disposed on a second side in the orthogonal cross section and connected to the back surface, and an intermediate surface connected to each of the first connection surface and the second connection surface and having a main design surface disposed such that a direction in which (Continued)

the main design surface is oriented is different from each of the first connection surface and the second connection surface.

13 Claims, 23 Drawing Sheets

(51) Int. Cl.
*B60R 13/00* (2006.01)
*G01S 13/931* (2020.01)
*G01S 13/93* (2020.01)
*H01Q 1/42* (2006.01)

(56) References Cited

U.S. PATENT DOCUMENTS

| | | | | | |
|---|---|---|---|---|---|
| 8,974,712 | B2* | 3/2015 | Ohtake | ............... | G01S 7/03 264/255 |
| 10,431,884 | B2* | 10/2019 | Takahashi | ............... | C23C 14/34 |
| 2004/0125023 | A1* | 7/2004 | Fujii | ............... | H01Q 1/3291 343/700 MS |
| 2005/0062660 | A1* | 3/2005 | Henderson | ........... | H01Q 1/3233 343/754 |
| 2005/0168374 | A1* | 8/2005 | Kamiya | ............... | H01Q 1/3233 342/1 |
| 2005/0237261 | A1* | 10/2005 | Fujii | ............... | H01Q 1/40 343/872 |
| 2007/0109206 | A1* | 5/2007 | Fujii | ............... | H01Q 1/3233 343/711 |
| 2007/0115167 | A1* | 5/2007 | Fujii | ............... | H01Q 1/3233 342/70 |
| 2007/0117380 | A1* | 5/2007 | Ido | ............... | H01Q 1/42 438/653 |
| 2007/0139287 | A1* | 6/2007 | Inomata | ............... | H01Q 13/02 343/786 |
| 2008/0233367 | A1* | 9/2008 | Maeda | ............... | H01Q 1/3233 428/201 |
| 2008/0309579 | A1* | 12/2008 | Maeda | ............... | H01Q 1/42 343/872 |
| 2010/0028610 | A1* | 2/2010 | Fujii | ............... | H01Q 1/3233 428/164 |
| 2011/0047784 | A1* | 3/2011 | Ohtake | ............... | G01S 7/03 29/600 |
| 2011/0088827 | A1* | 4/2011 | Zanini | ............... | B60R 13/005 156/63 |
| 2011/0273356 | A1* | 11/2011 | Kawaguchi | ............... | C23C 14/35 343/873 |
| 2012/0119961 | A1* | 5/2012 | Mayer Pujadas | ........ | H01Q 1/38 343/713 |
| 2014/0093665 | A1* | 4/2014 | Horibe | ............... | B60R 13/04 428/31 |
| 2014/0354465 | A1 | 12/2014 | Lee et al. | | |
| 2015/0086731 | A1* | 3/2015 | Sugiura | ............... | B44C 1/1729 428/31 |
| 2015/0140259 | A1* | 5/2015 | Sugiura | ............... | B60R 13/005 428/72 |
| 2016/0111776 | A1* | 4/2016 | Okumura | ............... | H01Q 1/422 343/872 |
| 2016/0248152 | A1* | 8/2016 | Takao | ............... | H01Q 1/422 |
| 2017/0057424 | A1* | 3/2017 | Yamada | ............... | G01S 13/931 |
| 2017/0136739 | A1* | 5/2017 | Okumura | ............... | B44C 3/025 |
| 2018/0056910 | A1* | 3/2018 | Hong | ............... | B60R 19/52 |
| 2018/0159207 | A1* | 6/2018 | Shurish | ............... | H01Q 1/422 |
| 2018/0254551 | A1* | 9/2018 | Guretzky | ............... | G01S 7/032 |
| 2019/0115666 | A1* | 4/2019 | Ochiai | ............... | H01Q 17/001 |
| 2019/0143909 | A1* | 5/2019 | Mayer Pujadas | .... | H01Q 1/3283 342/70 |
| 2019/0271458 | A1* | 9/2019 | Brown | ............... | F21S 41/285 |
| 2019/0305411 | A1* | 10/2019 | Mayer Pujadas | .... | H01Q 1/3233 |

FOREIGN PATENT DOCUMENTS

| | | |
|---|---|---|
| JP | 2012-111045 A | 6/2012 |
| JP | 2012-112660 A | 6/2012 |
| JP | 2016080479 A | 5/2016 |
| JP | 2016141355 A | 8/2016 |

OTHER PUBLICATIONS

Japanese Office Action for Application No. 2019-118756 dated Jun. 16, 2020.

International Search Report dated Feb. 13, 2018 for PCT Application No. PCT/JP2017/043783.

* cited by examiner

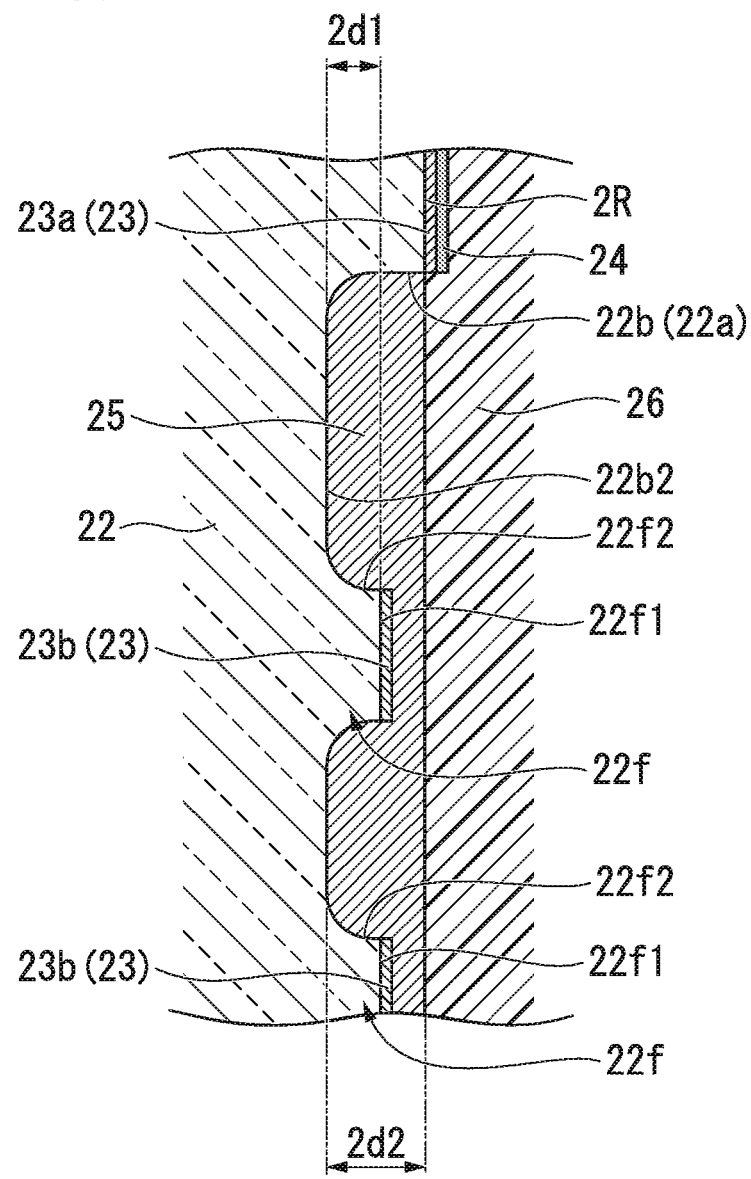

RADAR COVER AND METHOD FOR MANUFACTURING RADAR COVER

CROSS-REFERENCE TO RELATED APPLICATIONS

The present application is a national phase application of the international application number PCT/JP2017/043783 filed on Dec. 6, 2017, which claims priority based on Japanese Patent Application No. 2016-239660 filed on Dec. 9, 2016 and Japanese Patent Application No. 2016-252958 filed on Dec. 27, 2016, the contents of which are incorporated herein by reference.

TECHNICAL FIELD AND BACKGROUND ART

The present invention relates to a radar cover and a method for manufacturing the radar cover. In recent years, a radar unit for detecting an obstacle or the like around a vehicle using a radio wave such as a millimeter wave have been mounted on the vehicle.

Generally, a radar unit is installed in a vehicle in a state in which the radar unit is covered with a radar cover to which a decoration such as an emblem has been applied. Such a radar unit transmits and receives a radio wave that has passed through the radar cover. Therefore, for example, as disclosed in Patent Documents 1 and 2, of course, it is necessary to form the radar cover so as to transmit a radio wave.

PRIOR ART DOCUMENTS

Patent Documents

[Patent Document 1] Japanese Unexamined Patent Application, First Publication No. 2016-141355
[Patent Document 2] Japanese Unexamined Patent Application, First Publication No. 2016-80479

DISCLOSURE OF INVENTION

Problems to be Solved by the Invention

By the way, a radar cover as disclosed in the above Patent Document 1 generally has, a transparent member disposed toward the outside of a vehicle, and a support member for supporting the transparent member from a back side. The transparent member and the support member are integrally formed by two-color molding of a resin. Such a radar cover has been enlarged in recent years. In addition to an emblem, various decorations may be applied to the radar cover. For example, by forming a curved recess on a back surface of the transparent member and applying a paint to an inner wall surface of the recess, a decoration visually recognizable from the outside of the transparent member may be applied.

However, the decoration formed by applying a paint to the inner wall surface of the recess formed on a back surface of the transparent member is formed inside the radar cover. Therefore, due to restrictions on the thickness dimension of the radar cover or the like, a stereoscopic effect may be poorer than a decoration applied to the outside of the radar cover. Particularly, in recent years, a paint that changes the color thereof depending on a visual recognition direction has also been developed. However, merely by applying such a paint to the inner wall surface of the curved recess, only the color gradually and continuously changes, and it is difficult to enhance a stereoscopic effect.

A radar cover as disclosed in the above Patent Document 2 generally has, a transparent member disposed toward the outside of a vehicle, and a support member for supporting the transparent member from a back side. The transparent member and the support member are integrally formed by two-color molding of a resin. Therefore, when a metal layer is formed between the transparent member and the support member, the metal layer can be visually recognized from the outside through the transparent member, and an emblem or a pattern can be formed by the metal layer.

For example, as disclosed in Patent Document 2, in order to impart a stereoscopic effect such as an emblem, a recess may be formed on a back surface of the transparent member, and a metal layer may be disposed along an inner wall surface of the recess. In such a case, when a character or a pattern is superimposed on the metal layer when viewed from the front, it is conceivable to form a colored layer such as a print layer on a bottom surface of the recess. However, when the colored layer is formed on the bottom surface of the recess, a character or a pattern formed by the colored layer is planar, and this may impair a stereoscopic effect such as an emblem.

The present invention has been achieved in view of the above circumstances, and a first object of the present invention is to improve a stereoscopic effect of a decoration formed inside a radar cover.

In addition, a second object of the present invention is to impart a stereoscopic effect to a character or a pattern formed by a colored layer formed on an inner wall surface of a recess in a radar cover having the recess on a back surface of a transparent member.

Means for Solving the Problem

The present invention adopts the following configuration as a means for solving the above problems.

A first aspect of the present invention is a radar cover disposed on a path of a radio wave of a radar unit for detecting a surrounding situation of a vehicle, the radar cover including a transparent member and a support member for supporting a back surface of the transparent member. The transparent member has an extension recess recessed toward a front surface side from the back surface, extending along the back surface, and having a paint layer formed on an inner wall surface thereof. The inner wall surface of the extension recess has, a first connection surface disposed on a first side in an orthogonal cross section with respect to an extension direction of the extension recess and connected to the back surface, a second connection surface disposed on a second side in the orthogonal cross section and connected to the back surface, and an intermediate surface connected to each of the first connection surface and the second connection surface and having a main design surface disposed such that a direction in which the main design surface is oriented is different from each of the first connection surface and the second connection surface.

The radar cover according to the first aspect may have a lateral recess configured as the extension recess and extending in the horizontal direction, and the main design surface may be a flat surface inclined so as to extend downward toward a front surface side of the transparent member.

In the first aspect, the main design surface may be wider than each of the first connection surface and the second connection surface.

The radar cover according to the first aspect may have, an upper extension recess configured as the extension recess and disposed above the center of the transparent member in an up-down direction, and a lower extension recess configured as the extension recess and disposed below the center of the transparent member in the up-down direction.

In the first aspect, the paint layer may be formed of a mica paint containing mica particles.

In the first aspect, the intermediate surface may have, a first curved surface connected to the first connection surface, and a second curved surface connected to the second connection surface, and the main design surface may be disposed between the first curved surface and the second curved surface and formed in a flat surface.

A second aspect of the present invention is a radar cover disposed on a path of a radio wave of a radar unit for detecting a surrounding situation of a vehicle, the radar cover including, a transparent member having a recess formed on a back surface thereof, a colored layer formed on an inner wall surface of the recess, and a support member for supporting the back surface of the transparent member. The transparent member has a protrusion protruding from a bottom of the recess and having the colored layer formed on a distal end surface thereof.

In the second aspect, the distal end surface of the protrusion may be connected to a circumferential surface of the protrusion such that a connecting portion between the distal end surface and the circumferential surface is angular.

In the second aspect, the distal end surface of the protrusion may be positioned at a front surface side of the transparent member compared to a back surface of the transparent member.

A third aspect of the present invention is a method for manufacturing a radar cover disposed on a path of a radio wave of a radar unit for detecting a surrounding situation of a vehicle, in which the radar cover includes, a transparent member having a recess formed on a back surface thereof, a colored layer formed on an inner wall surface of the recess, and a support member for supporting the back surface of the transparent member, and the method includes, a transparent member forming step of forming the transparent member having a protrusion protruding from a bottom of the recess and having the colored layer formed on a distal end surface thereof, a coloring layer forming step of forming the colored layer on the distal end surface of the protrusion, and a support member forming step of forming the support member.

In the transparent member forming step of the third aspect, the transparent member may be formed such that a connecting portion between the distal end surface of the protrusion and the circumferential surface of the protrusion is angular.

In the transparent member forming step of the third aspect, the transparent member may be formed such that the distal end surface of the protrusion is positioned at a front surface side of the transparent member compared to the back surface of the transparent member.

In the colored layer forming step of the third aspect, the colored layer may be formed on the distal end surface of the protrusion by transferring ink by a pad printing method.

Effects of the Invention

According to the first aspect of the present invention, the extension recess formed on the back surface of the transparent member has, a first connection surface disposed on a first side in an orthogonal cross section with respect to an extension direction of the extension recess and connected to the back surface, a second connection surface disposed on a second side in the orthogonal cross section with respect to the extension direction of the extension recess and connected to the back surface, and an intermediate surface connected to each of the first connection surface and the second connection surface, and the intermediate surface has a main design surface. Furthermore, the main design surface is disposed such that a direction in which the main design surface is oriented is different from each of the first connection surface and the second connection surface. Therefore, when the paint layer formed on the inner wall surface of the extension recess is viewed from a certain point outside a vehicle, a visual recognition angle with respect to the paint layer formed on the first connection surface and the second connection surface is different from a visual recognition angle with respect to the paint layer formed on the main design surface. As a result, the appearance of the paint layer formed on the first connection surface and the second connection surface is different from the appearance of the paint layer formed on the main design surface, when viewed by a viewer. Therefore, a stereoscopic effect of decoration formed by the paint layer increases. Therefore, according to the first aspect of the present invention, it is possible to improve a stereoscopic effect of decoration formed inside the radar cover.

According to the second and third aspects of the present invention, the transparent member has a protrusion protruding from a bottom of a recess formed on a back surface thereof and having a colored layer formed on a distal end surface thereof. When such a colored layer formed on the distal end surface of the protrusion is visually recognized from the outside of the transparent member, surroundings of the colored layer are visually recognized to be brighter or darker than the colored layer, and a character or a pattern formed by the colored layer can have a stereoscopic appearance. Therefore, according to the second and third aspects of the present invention, it is possible to impart a stereoscopic effect to a character or a pattern formed by the colored layer formed on the inner wall surface of the recess in the radar cover having the recess on a back surface of the transparent member.

BRIEF DESCRIPTION OF THE DRAWINGS

FIG. 11 is a schematic enlarged cross-sectional view including a part of an inner core housing recess included in the radar cover according to the second embodiment of the present invention.

EMBODIMENTS FOR CARRYING OUT THE INVENTION

First Embodiment

Hereinafter, a radar cover according to a first embodiment of the present invention will be described with reference to the drawings. Incidentally, in the following drawings, in order to make each member have a recognizable size, the scale of each member is appropriately changed.

Figure 1:
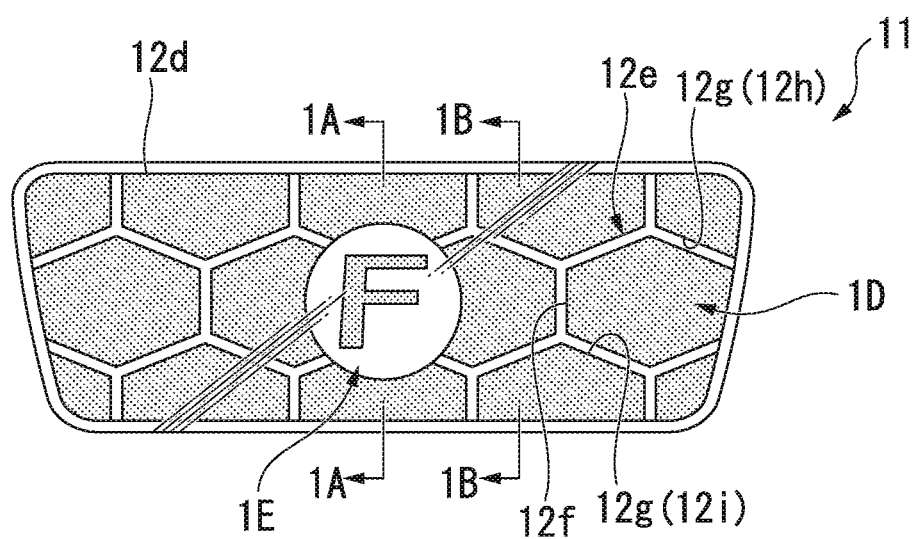
FIG. 1 is a front view schematically showing a radar cover according to a first embodiment of the present invention.
Figure 2A:
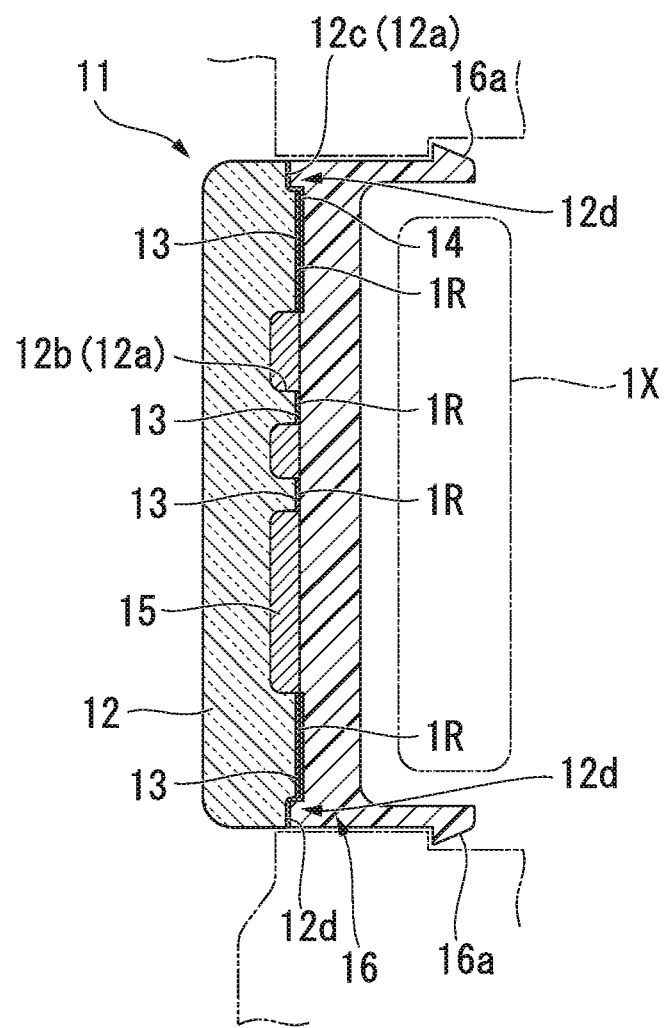
FIG. 2A is a cross-sectional view taken along line 1A-1A of FIG. 1.
Figure 2B:
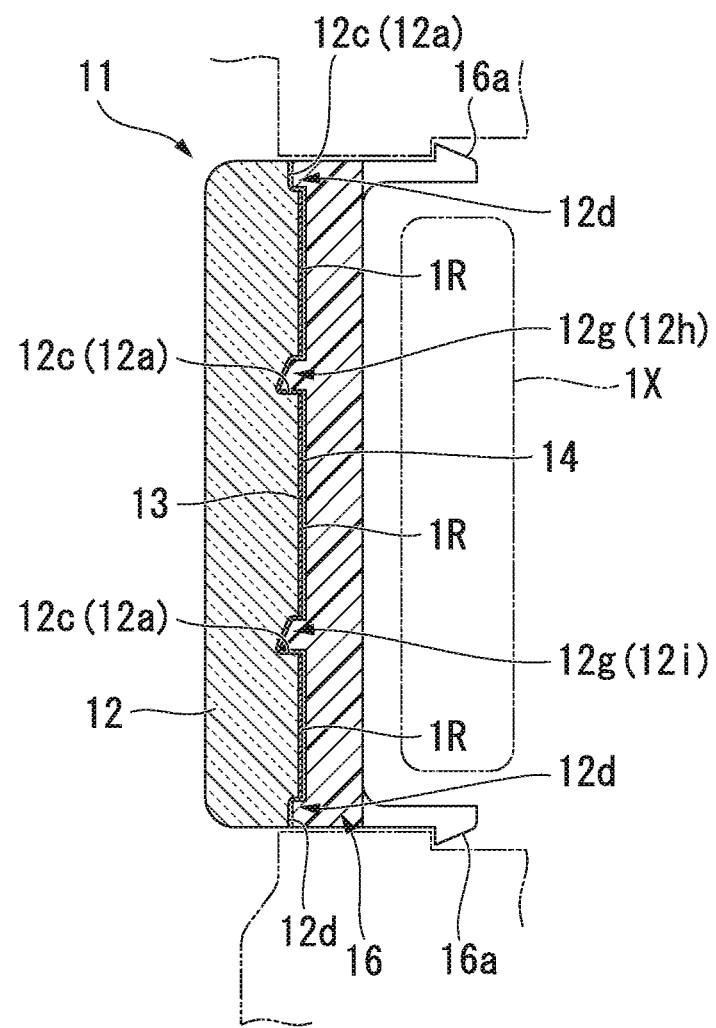
FIG. 2B is a cross-sectional view taken along line 1B-1B of FIG. 1.

FIG. 1 is a front view schematically showing a radar cover 11 of the present embodiment. FIG. 2A is a cross-sectional view taken along line 1A-1A of FIG. 1. FIG. 2B is a cross-sectional view taken along line 1B-1B of FIG. 1. As shown in FIG. 1, the radar cover 11 of the present embodiment has an emblem 1E disposed at the center and a mesh-like outer design portion 1D disposed around the emblem 1E. Incidentally, in FIG. 1, a part of the emblem 1E and a part of the outer design portion 1D are shown in white, but the region shown in white is silver in the present embodiment. A region indicated by a dot pattern in the emblem 1E and the outer design portion 1D is black in the present embodiment.

As shown in FIGS. 2A and 2B, the radar cover 11 of the present embodiment is disposed so as to cover a radar unit 1X for detecting a surrounding situation of a vehicle from a front side of the vehicle, and transmits a radio wave used in the radar unit 1X. Such a radar cover 11 of the present embodiment is disposed on a path of a radio wave of the radar unit 1X (in a region through which a radio wave emitted from the radar unit 1X is propagated), and includes a transparent member 12, a print layer 13, a paint layer 14, an inner core 15, and a support member 16 as shown in FIGS. 2A and 2B. Hereinafter, the up-down direction on the sheet in FIGS. 1, 2A, and 2B is simply referred to as an up-down direction. The up-down direction is the same as the vertical direction when the radar cover 11 is installed in a vehicle.

The transparent member 12 is formed of a transparent resin material and is disposed at the outermost side of a vehicle among constituent members of the radar cover 11. A front surface of the transparent member 12 is formed in a smooth surface in order to enhance visibility of the emblem 1E and the outer design portion 1D as viewed from the outside of the vehicle. On a back surface of the transparent member 12 (a surface on a side of the support member 16), a recess 12a recessed toward a front surface side is formed. In the radar cover 11 of the present embodiment, the transparent member 12 includes, as the recess 12a, an inner core housing recess 12b having the inner core 15 housed therein, and a painted recess 12c having the paint layer 14 formed therein by application of a paint to the inner wall surface. A surface of the transparent member 12 on a side of the radar unit 1X is referred to as a back surface, and the surface opposite thereto is referred to as a front surface (front). A side on which a back surface of the transparent member 12 is located may be referred to as a back side, and a side on which a front surface thereof is located may be referred to as a front side. A direction in which the front surface and the back surface of the transparent member 12 face each other, that is, a left-right direction on the sheet in FIGS. 2A and 2B may be referred to as a thickness direction.

The inner core housing recess 12b is formed in a circular shape when viewed from the front and is disposed at the center of the radar cover 11 on which the emblem 1E is disposed. A circular outer edge of the inner core housing recess 12b is disposed avoiding the character "F" shown in FIG. 1, and the character "F" is located inside the circular outer edge. Such an inner core housing recess 12b houses the inner core 15 in a state in which the inner core 15 is in contact with the inner wall surface.

The painted recess 12c has a frame-like portion 12d formed in a frame shape in an outer edge portion of the radar cover 11 and a mesh-like portion 12e formed in a mesh shape inside the frame-like portion 12d, when viewed from the front. In such a painted recess 12c, the paint layer 14 is disposed so as to cover the inner wall surface. A part of the support member 16 enters the painted recess 12c, and the paint layer 14 is covered from the back side by the support member 16.

As shown in FIG. 1, in the present embodiment, the mesh-like portion 12e has a shape in which a plurality of substantially regular hexagons is disposed in a close contact state, and has, a longitudinal recess 12f (extension recess) extending parallel to the vertical direction, and a lateral recess 12g (extension recess) extending in the horizontal direction. That is, the longitudinal recess 12f and the lateral recess 12g are configured as extension recesses of the present invention. Incidentally, as shown in FIG. 1, the lateral recess 12g in the present embodiment extends in a direction not parallel to the horizontal direction. The lateral recess in the present invention includes those not parallel to the horizontal direction, such as the lateral recess 12g of the present embodiment shown in FIG. 1, and only needs to have a horizontal direction component in an extension direction. The longitudinal recess 12f and the lateral recess 12g extend along the back surface of the transparent member 12, in other words, each extend in a direction orthogonal to the thickness direction.

In the present embodiment, the lateral recess 12g is formed both above and below the center of the transparent member 12 in the up-down direction. Hereinafter, the lateral recess 12g disposed above the center of the transparent member 12 in the up-down direction is referred to as an upper lateral recess 12h (upper extension recess), and the lateral recess 12g disposed below the center of the transparent member 12 in the up-down direction is referred to as lower lateral recess 12i (lower extension recess). That is, each of the upper lateral recess 12h and the lower lateral recess 12i is configured as an extension recess of the present invention.

In the present embodiment, a region in which the recess 12a is not formed on a surface (back surface) of the transparent member 12 on a side of the support member 16 is configured as a print layer forming region 1R where the print layer 13 is formed. The print layer forming region 1R is formed in a flat surface and is covered from a back side of the transparent member 12 by the print layer 13.

Figure 3:
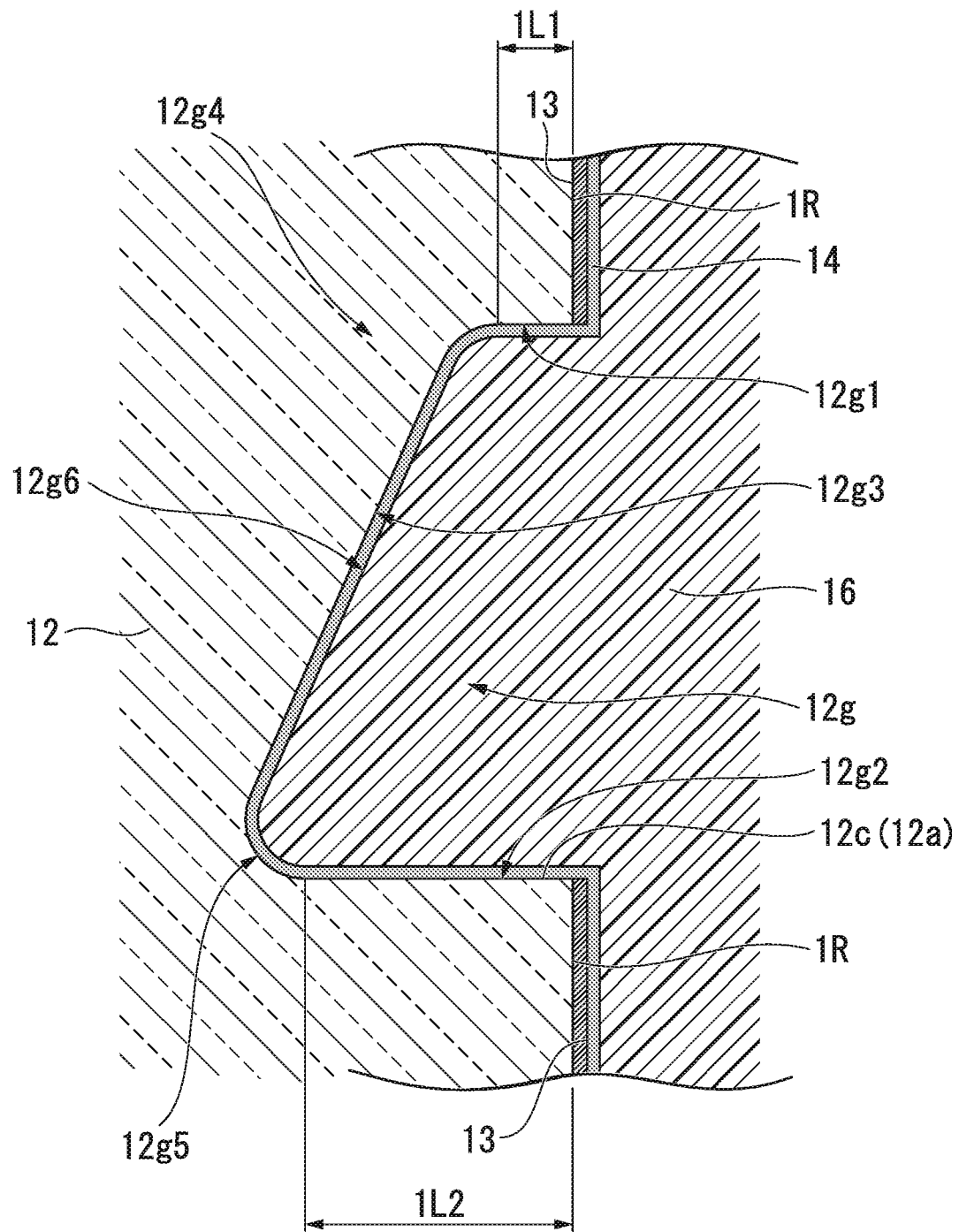
FIG. 3 is an enlarged cross-sectional view of a lateral recess included in the radar cover according to the first embodiment of the present invention.

FIG. 3 is an enlarged cross-sectional view of the lateral recess 12g. As shown in FIG. 3, in the radar cover 11 of the present embodiment, the inner wall surface of the lateral recess 12g has, an upper connection surface 12g1 (first connection surface), a lower connection surface 12g2 (second connection surface), and an intermediate surface 12g3. The upper connection surface 12g1 forms an upper portion of the lateral recess 12g and is bent and connected to the back surface of the transparent member 12 (print layer forming region 1R). That is, a connecting portion between the upper connection surface 12g1 and the print layer forming region 1R is angular backward and obliquely downward. The lower connection surface 12g2 forms a lower portion of the lateral recess 12g and is bent and connected to the back surface of the transparent member 12 (print layer forming region 1R). That is, a connecting portion between the lower connection surface 12g2 and the print layer forming region 1R is angular backward and obliquely upward. That is, in the present embodiment, the inner wall surface of the lateral recess 12g has, the upper connection surface 12g1 disposed on one side (first side) of an orthogonal cross section with respect to an extension direction of the lateral recess 12g, and the lower connection surface 12g2 disposed on the other side (second side) of the orthogonal cross section with respect to the extension direction of the lateral recess 12g. The upper connection surface 12g1 and the lower connection surface 12g2 are bent at an angle of approximately 90° and connected to the back surface of the transparent member 12 (print layer forming region 1R).

Note that the angle formed by each of the upper connection surface 12g1 and the lower connection surface 12g2 and the back surface of the transparent member 12 (print layer forming region 1R) may be about 93° in consideration of a draft during injection molding. That is, the angle formed by each of the upper connection surface 12g1 and the lower connection surface 12g2 and the back surface of the transparent member 12 (the print layer forming region 1R) may be an obtuse angle.

The intermediate surface 12g3 connects the upper connection surface 12g1 to the lower connection surface 12g2, and has, an upper curved surface 12g4 (first curved surface) smoothly connected to the upper connection surface 12g1 without being bent, a lower curved surface 12g5 (second curved surface) smoothly connected to the lower connection surface 12g2 without being bent, and a main design surface 12g6 disposed between the upper curved surface 12g4 and the lower curved surface 12g5. The main design surface 12g6 is a region mainly forming the shape of a mesh-like pattern of the outer design portion 1D when the radar cover 11 of the present embodiment is visually recognized from the outside. The main design surface 12g6 is formed in a flat surface such that when an orthogonal axis perpendicular to the main design surface 12g6 is virtually considered, the orthogonal axis goes upward toward the front of a vehicle. That is, the main design surface 12g6 is a flat surface inclined such that a direction perpendicular to the main design surface 12g6 goes upward toward a front surface side of the transparent member 12. In other words, the main design surface 12g6 is a flat surface inclined so as to extend downward toward the front surface side of the transparent member 12. In the present embodiment, as shown in FIG. 3, the main design surface 12g6 is disposed in such a posture that the main design surface 12g6 has a different angle from the upper connection surface 12g1 and the lower connection surface 12g2 with respect to the vertical axis, and has a larger area than the upper connection surface 12g1 and the lower connection surface 12g2. In other words, the main design surface 12g6 is disposed such that a direction in which the main design surface 12g6 is oriented (a direction orthogonal to the main design surface 12g6) is different from each of the upper connection surface 12g1 and the lower connection surface 12g2.

Incidentally, similarly to the lateral recess 12g, the inner wall surface of the longitudinal recess 12f also has, a first connection surface disposed on one side in an orthogonal cross section with respect to an extension direction of the longitudinal recess 12f and connected to a back surface of the transparent member 12, a second connection surface disposed on the other side in the orthogonal cross section with respect to the extension direction of the longitudinal recess 12f and connected to the back surface of the transparent member 12, and an intermediate surface connected to each of the first connection surface and the second connection surface and having a main design surface set at a different angle from each of the first connection surface and the second connection surface. In other words, the main design surface is disposed such that a direction in which the main design surface is oriented is different from each of the first connection surface and the second connection surface. In addition to the main design surface, the intermediate surface has, a first curved surface interposed between the main design surface and the first connection surface, and a second curved surface interposed between the main design surface and the second connection surface.

Such a transparent member 12 is formed of a transparent synthetic resin such as colorless polycarbonate (PC) or a polymethyl methacrylate resin (PMMA), for example, and has a thickness of about 1.5 mm to 10 mm. A front surface of the transparent member 12 is subjected to a hard coat treatment for preventing scratches or a clear coat treatment with a urethane-based paint as necessary. Note that a transparent synthetic resin having scratch resistance does not need to be subjected to the scratch preventing treatment.

With reference to FIGS. 2A and 2B again, the print layer 13 is a thin film layer printed on the print layer forming region 1R of the transparent member 12 and is black as described above in the present embodiment. The print layer 13 is formed by transferring black ink onto the print layer forming region 1R and drying the ink. The print layer 13 can be formed by putting a black resin ink capable of transmitting a radio wave used in the radar unit 1X on the print layer forming region 1R, for example, by a silk printing method and drying the ink naturally. Such a print layer 13 is visually recognizable from the outside through the transparent member 12 and forms a region indicated by the dot pattern shown in FIG. 1.

The paint layer 14 is a thin film layer formed by drying a silver paint capable of transmitting a radio wave used in the radar unit 1X and is silver as described above in the present embodiment.

As shown in FIGS. 2A and 2B, the paint layer 14 is disposed on the entire back surface of the transparent member 12 on which the print layer 13 is formed except for a region where the emblem 1E is formed. That is, the paint layer 14 covers a surface of the print layer 13 on a side of the support member 16 except for the region where the emblem 1E is formed. The paint layer 14 can be formed, for example, by applying a paint containing a pearl pigment and drying the paint naturally. Such a paint layer 14 is visually recognizable from the outside through the transparent member 12 and forms a region indicated by white of the outer design portion 1D shown in FIG. 1 in the painted recess 12c.

Such a paint layer 14 contains mica particles in the present embodiment. The mica particles reflect light incident on the paint layer 14 from the outside. When such a paint layer 14 is visually recognized from a direction perpendicular to the paint layer 14, the paint layer 14 looks bright, and the mica particles appear to shine intensely. Meanwhile, when the paint layer 14 is visually recognized from a direction largely deviated from the direction perpendicular to the paint layer 14, the paint layer 14 looks dark, and the mica particles appear to shine weakly.

The inner core 15 has, a base formed of a resin capable of transmitting a radio wave used in the radar unit 1X, and a glittering film formed so as to cover a front surface of the base. Examples of the glittering film include an indium film which is a discontinuous film having many gaps capable of transmitting a radio wave formed therein. Such an indium film can be formed, for example, by a vacuum vapor deposition method or a sputtering method. Note that the inner core 15 may have a transparent top coat layer covering a front surface of the glittering film or an undercoat layer covering a back surface of the glittering film. Such an inner core 15 is fitted and disposed in the inner core housing recess 12b of the transparent member 12 such that the glittering film faces the inner wall surface of the inner core housing recess 12b. Such an inner core 15 is visually recognizable from the outside through the transparent member 12 and forms a region indicated by white of the emblem 1E shown in FIG. 1.

The support member 16 is a part bonded to the back surface of the transparent member 12 and supporting the transparent member 12, and is formed of a black resin material. The support member 16 has an engaging portion 16a protruding toward a side of an engine room (back side) of a vehicle. The engaging portion 16a has a claw-shaped distal end portion, and the distal end portion is engaged, for example, with a radiator grill main body of a vehicle. Such a support member 16 is formed of a synthetic resin such as an acrylonitrile/butadiene/styrene copolymer synthetic resin (ABS), an acrylonitrile/ethylene/styrene copolymer synthetic resin (AES), acrylonitrile/styrene/acrylate (ASA), polybutylene terephthalate (PBT), a colored PC, or polyethylene terephthalate (PET), or a composite resin thereof, and has a thickness of about 1.0 mm to 10 mm.

Subsequently, a method for manufacturing the radar cover 11 of the present embodiment will be described with reference to FIGS. 4A to 8B.

Figure 4A:
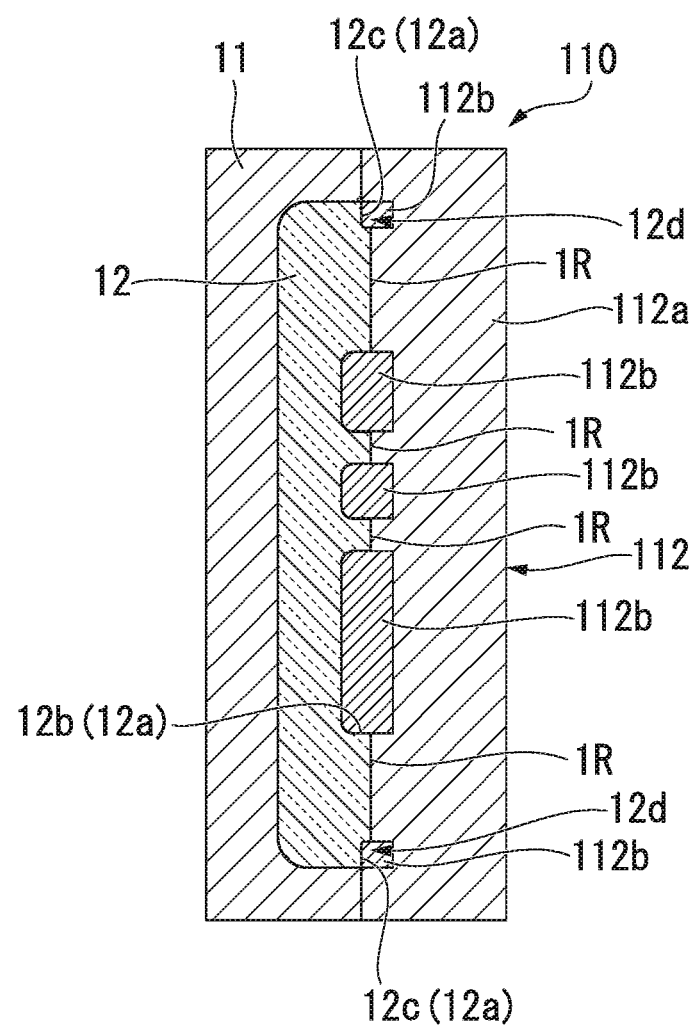
FIG. 4A is a schematic view showing a method for manufacturing the radar cover according to the first embodiment of the present invention.
Figure 4B:
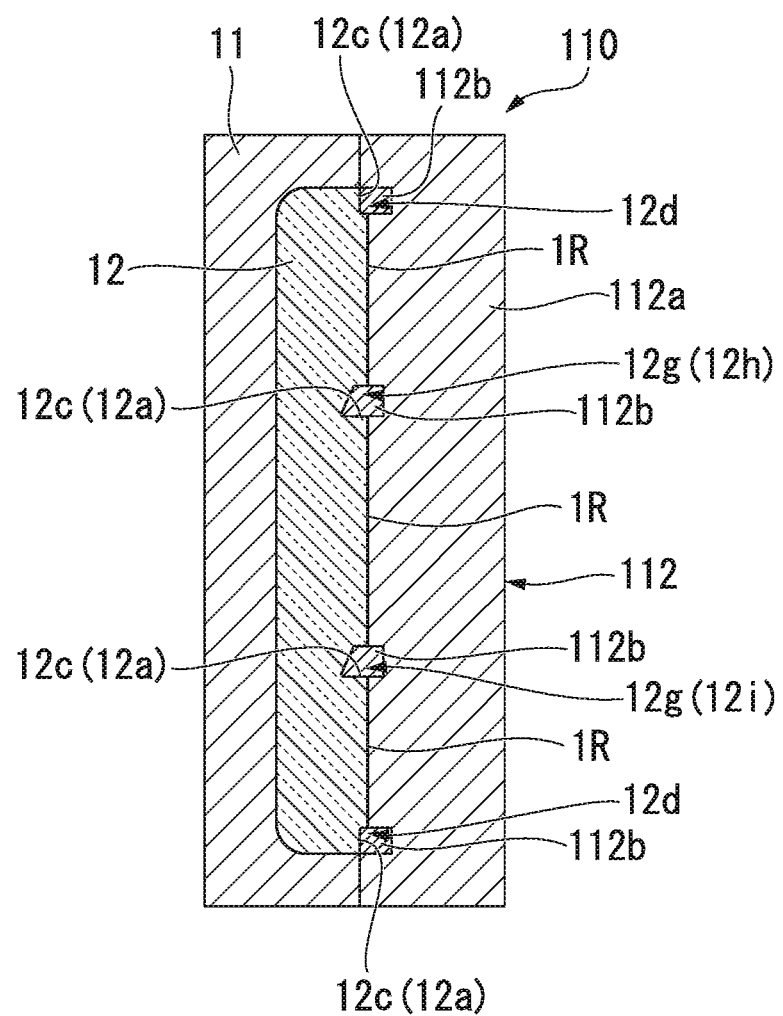
FIG. 4B is a schematic view showing the method for manufacturing the radar cover according to the first embodiment of the present invention.

First, as shown in FIGS. 4A and 4B, the transparent member 12 is formed. Note that FIG. 4A is a cross-sectional view at the same position as FIG. 2A, and FIG. 4B is a cross-sectional view at the same position as FIG. 2B. Here, the transparent member 12 is formed by injection molding using a die 110. The die 110 has a fixed side cavity die 111 and a moving side core die 112. Furthermore, in the present embodiment, the core die 112 has, a base 112a forming the print layer forming region 1R, and a nest 112b for forming the recess 12a. The nest 112b is formed separately from the base 112a of the core die 112 and protrudes from a front surface of the base 112a toward a side of the cavity die 111 in a state of being fixed to the base 112a. By disposing the nest 112b in the core die 112 as described above, a front surface of the base 112a and a front surface of the nest 112b can be bent and connected to each other to form the transparent member 12 in which the print layer forming region 1R and the inner wall surface of the recess 12a are bent and connected to each other.

Figure 5A:
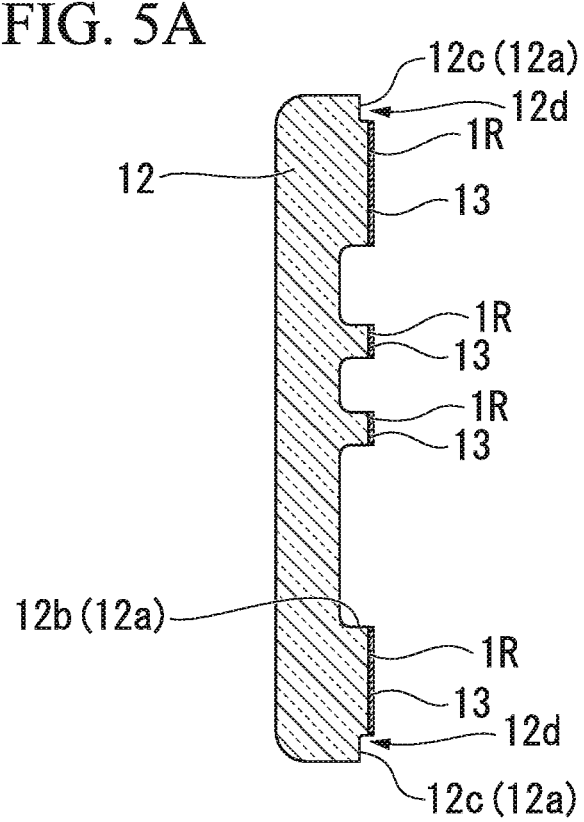
FIG. 5A is a schematic view showing the method for manufacturing the radar cover according to the first embodiment of the present invention.
Figure 5B:
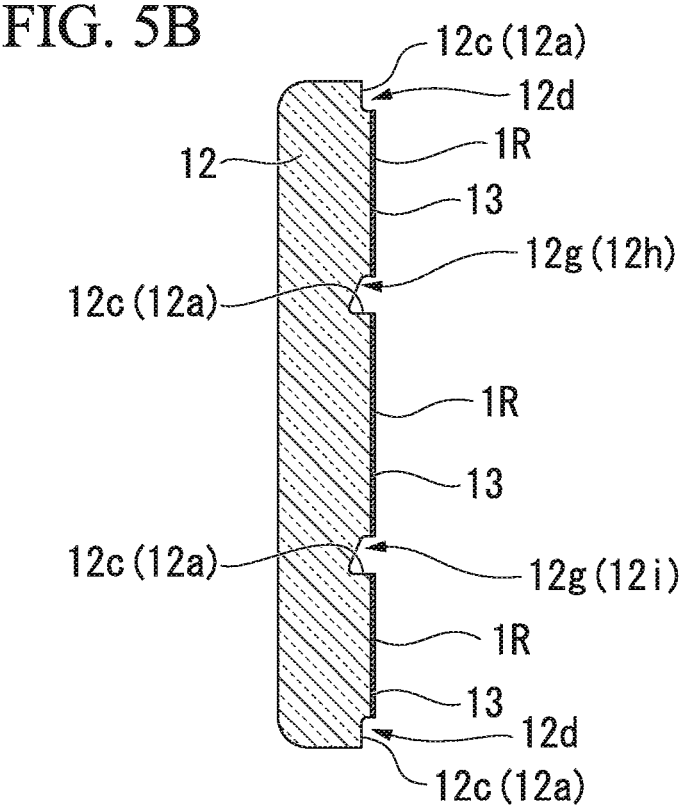
FIG. 5B is a schematic view showing the method for manufacturing the radar cover according to the first embodiment of the present invention.

Subsequently, as shown in FIGS. 5A and 5B, the print layer 13 is formed. Note that FIG. 5A is a cross-sectional view at the same position as FIG. 2A, and FIG. 5B is a cross-sectional view at the same position as FIG. 2B. Here, the print layer 13 is formed by transferring ink onto the print layer forming region 1R which is a region except for the recess 12a of the transparent member 12 by a printing method such as a silk printing method and drying the ink. At this time, in the radar cover 11 of the present embodiment, the print layer forming region 1R and the inner wall surface of the recess 12a are bent and connected to each other. Therefore, the ink transferred onto the print layer forming region 1R has more difficulty in moving to the inner wall surface of the recess 12a than a case where the print layer forming region 1R and the inner wall surface of the recess 12a are connected with a smooth curved surface. According to such a method for manufacturing the radar cover 11 of the present embodiment, it is possible to prevent unintentional movement of an end portion of the print layer 13.

Figure 6A:
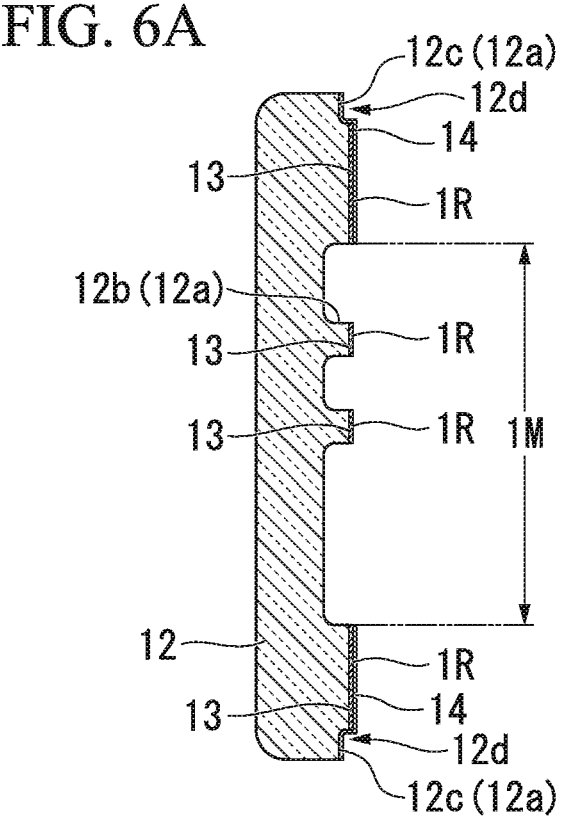
FIG. 6A is a schematic view showing the method for manufacturing the radar cover according to the first embodiment of the present invention.
Figure 6B:
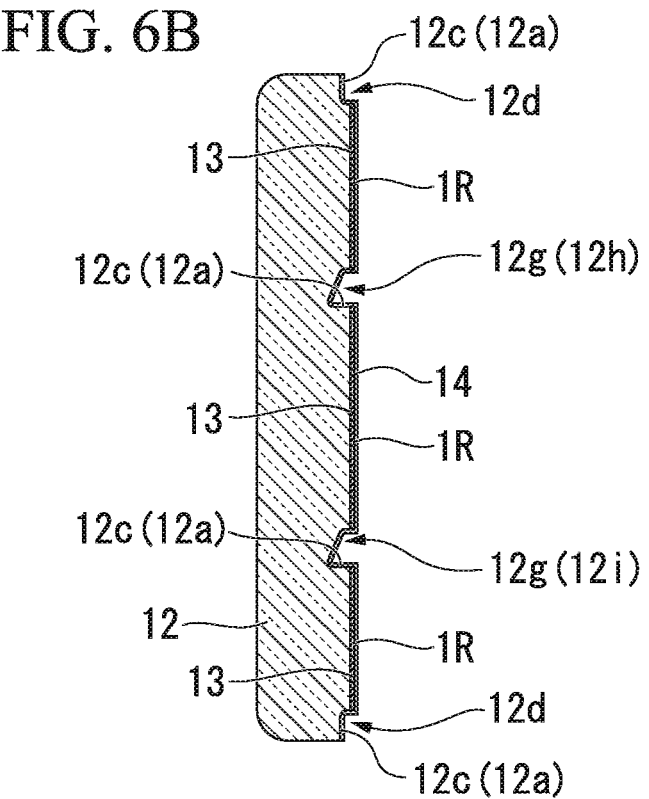
FIG. 6B is a schematic view showing the method for manufacturing the radar cover according to the first embodiment of the present invention.

Subsequently, as shown in FIGS. 6A and 6B, the paint layer 14 is formed. Note that FIG. 6A is a cross-sectional view at the same position as FIG. 2A, and FIG. 6B is a cross-sectional view at the same position as FIG. 2B. Here, in a state in which a region 1M where the emblem 1E shown in FIG. 6A is formed is masked, a silver mica paint is sprayed, for example, on a back side of the transparent member 12 on which the print layer 13 is formed, and the mica paint is dried to form the paint layer 14. In the paint layer 14 thus formed, the paint layer 14 covering the print layer 13 and directly adhering to the inner wall surface of the entire painted recess 12c is formed except for the region where the emblem 1E is formed.

Figure 7:
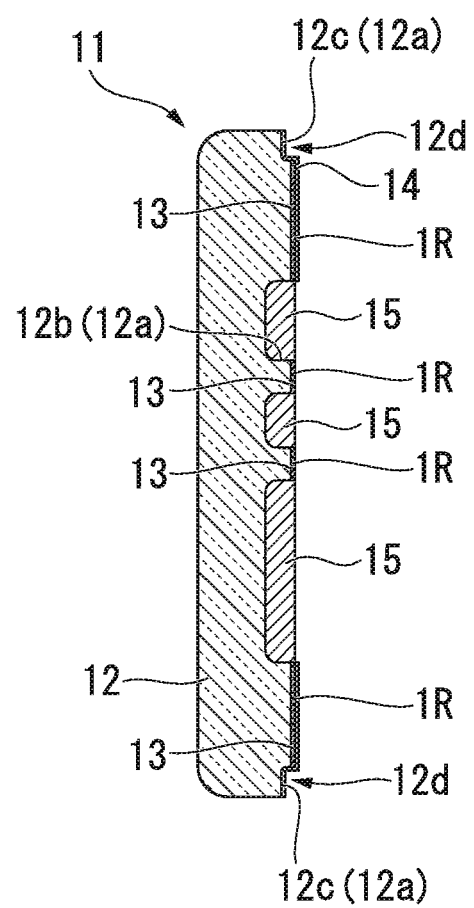
FIG. 7 is a schematic view showing the method for manufacturing the radar cover according to the first embodiment of the present invention.

Subsequently, as shown in FIG. 7, the inner core 15 is housed in the inner core housing recess 12b. Note that FIG. 7 is a cross-sectional view at the same position as FIG. 2A. Here, the inner core 15 formed in parallel to formation of the above-described transparent member 12, print layer 13, or paint layer 14 is housed in the inner core housing recess 12b. The inner core 15 is formed by forming a glittering discontinuous metal film such as an indium layer on a base formed by injection molding in advance by a vacuum vapor deposition method, a sputtering method, or the like. Note that a topcoat layer or an undercoat layer is formed as necessary in the inner core 15. Such an inner core 15 is housed in the inner core housing recess 12b with the glittering discontinuous metal film facing a side of the inner wall surface of the inner core housing recess 12b.

Figure 8A:
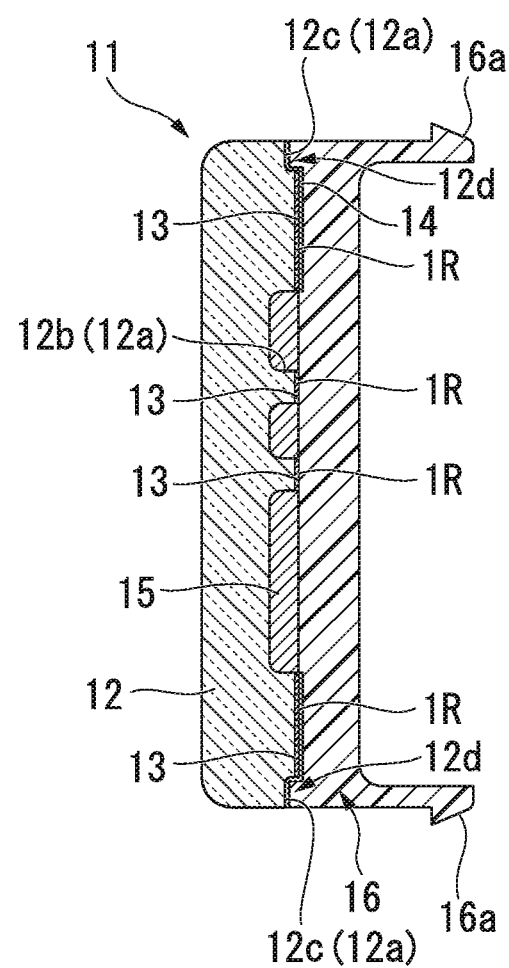
FIG. 8A is a schematic view showing the method for manufacturing the radar cover according to the first embodiment of the present invention.
Figure 8B:
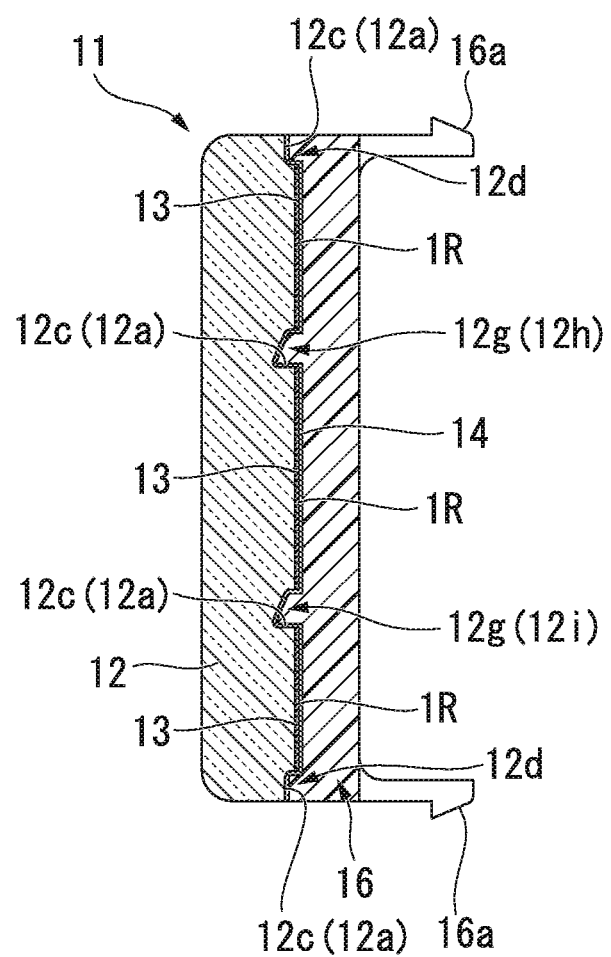
FIG. 8B is a schematic view showing the method for manufacturing the radar cover according to the first embodiment of the present invention.

Subsequently, as shown in FIGS. 8A and 8B, the support member 16 is formed. Note that FIG. 8A is a cross-sectional view at the same position as FIG. 2A, and FIG. 8B is a cross-sectional view at the same position as FIG. 2B. Here, the transparent member 12 having the inner core 15 disposed in the inner core housing recess 12b is disposed inside a die for injection molding, and insert molding for emitting a molten resin to the back side of the transparent member 12 is performed to form the support member 16. Such a support member 16 is welded to the transparent member 12 by heat during insert molding and disposed so as to cover the inner core 15. As a result, the inner core 15 is fixed to the transparent member 12. Note that the transparent member 12 and the support member 16 may be each individually formed by injection molding or the like, and then the transparent member 12 and the support member 16 may be coupled together using an adhesive, a fastening member, or the like. Even in this case, the support member 16 supports the transparent member 12.

According to the radar cover 11 of the present embodiment as described above, the lateral recess 12g formed on the back surface of the transparent member 12 forms an upper portion of the lateral recess 12g and has, the upper connection surface 12g1 connected to the back surface of the transparent member 12, the lower connection surface 12g2 forming a lower portion of the lateral recess 12g and connected to the back surface of the transparent member 12, and the intermediate surface 12g3 connected to the upper connection surface 12g1 and the lower connection surface 12g2, and the intermediate surface 12g3 has the main design surface 12g6. Furthermore, the main design surface 12g6 is set at a different angle from the upper connection surface 12g1 and the lower connection surface 12g2. That is, the main design surface 12g6 is disposed such that a direction in which the main design surface 12g6 is oriented is different from each of the upper connection surface 12g1 and the lower connection surface 12g2. Therefore, when the paint layer 14 formed on the inner wall surface of the lateral recess 12g is viewed from a certain point outside a vehicle, a visual recognition angle with respect to the paint layer 14 formed on the upper connection surface 12g1 and the lower connection surface 12g2 is different from a visual recognition angle with respect to the paint layer 14 formed on the main design surface 12g6. As a result, the paint layer 14, the appearance of the paint layer 14 formed on the upper connection surface 12g1 and the lower connection surface 12g2 is different from the appearance of the paint layer 14 formed on the main design surface 12g6, when viewed by a viewer. Therefore, a stereoscopic effect of decoration formed by the paint layer 14 increases. Therefore, according to the radar cover 11 of the present embodiment, it is possible to improve a stereoscopic effect of decoration formed inside the radar cover 11.

In the radar cover 11 of the present embodiment, similarly to the lateral recess 12g, the longitudinal recess 12f also has, a first connection surface disposed on one side in an orthogonal cross section with respect to an extension direction of the longitudinal recess 12f and connected to a back surface of the transparent member 12, a second connection surface disposed on the other side in the orthogonal cross section with respect to the extension direction of the longitudinal recess 12f and connected to the back surface of the transparent member 12, and an intermediate surface connected to each of the first connection surface and the second connection surface and having a main design surface set at a different angle from each of the first connection surface and the second connection surface. In addition to the main design surface, the intermediate surface has, a first curved surface interposed between the main design surface and the first connection surface, and a second curved surface interposed between the main design surface and the second connection surface. Therefore, also in the longitudinal recess 12f, it is possible to increase the stereoscopic effect of decoration formed by the paint layer 14.

[In the radar cover 11 of the present embodiment, the main design surface 12g6 is formed in a flat surface inclined such that a direction perpendicular to the main design surface 12g6 goes upward toward a front surface side of the transparent member 12. In other words, the main design surface 12g6 is a flat surface inclined so as to extend downward toward the front surface side of the transparent member 12. In many cases, a viewer who visually recognizes the radar cover 11 from the outside looks down on the radar cover 11 obliquely from above. Therefore, by inclining the main design surface 12g6 so as to face upward, the main design surface 12g6 can directly face the viewer, and the entire outer design portion 1D can be recognized brightly. Therefore, the appearance of the paint layer 14 formed on the upper connection surface 12g1 and the lower connection surface 12g2 can be made relatively dark, and the appearance of the paint layer 14 formed on the main design surface 12g6 can be made relatively bright. It is possible to further improve the stereoscopic effect of decoration.

In the radar cover 11 of the present embodiment, the main design surface 12g6 is set so as to be wider than the upper connection surface 12g1 and the lower connection surface 12g2. This makes it possible to make the paint layer 14 formed on the main design surface 12g6 more conspicuous than the paint layer 14 formed on the upper connection surface 12g1 and the lower connection surface 12g2. Furthermore, as described above, when the main design surface 12g6 is inclined so as to face upward, a region corresponding to the main design surface 12g6 visually recognized to be bright is wider than a region corresponding to the upper connection surface 12g1 and the lower connection surface 12g2 visually recognized to be dark. Therefore, it is possible to improve decorative design.

The radar cover 11 of the present embodiment has, an upper lateral recess 12h which is the lateral recess 12g disposed above the center of the transparent member 12 in the up-down direction, and a lower lateral recess 12i which is the lateral recess 12g disposed below the center of the transparent member 12 in the up-down direction. Therefore, in the radar cover 11 of the present embodiment, it is possible to visually recognize both the decoration formed in an upper portion in the up-down direction and the decoration formed in a lower portion in the up-down direction stereoscopically. In particular, in both the upper lateral recess 12h and the lower lateral recess 12*i*, when the main design surface 12*g*6 is inclined upward and the main design surface 12*g*6 is set to be wider than the upper connection surface 12*g*1 and the lower connection surface 12*g*2, it is possible to visually recognize the entire outer design portion 1D stereoscopically and brightly.

In the radar cover 11 of the present embodiment, the paint layer 14 contains mica particles. Therefore, it is possible to make a region that looks bright more conspicuous, and it is possible to further improve a stereoscopic effect of decoration.

In the radar cover 11 of the present embodiment, the intermediate surface 12*g*3 has, the upper curved surface 12*g*4 (first curved surface) smoothly connected to the upper connection surface 12*g*1 without being bent, the lower curved surface 12*g*5 (second curved surface) smoothly connected to the lower connection surface 12*g*2 without being bent, and the main design surface 12*g*6 disposed between the upper curved surface 12*g*4 and the lower curved surface 12*g*5. Therefore, it is possible to change the appearance of the main design surface 12*g*6 and the appearance of the upper curved surface 12*g*4 and the lower curved surface 12*g*5, and it is possible to make the outline of the main design surface 12*g*6 conspicuous. For example, when the main design surface 12*g*6 looks dark, it is possible to make the upper curved surface 12*g*4 and the lower curved surface 12*g*5 look bright, and the outline of the main design surface 12*g*6 is conspicuous. Similarly, also in the longitudinal recess 12*f*, the intermediate surface has the curved surface (the first curved surface and the second curved surface). Therefore, the outline of the main design surface can be conspicuous. Therefore, according to the radar cover 11 of the present embodiment, it is possible to further improve a stereoscopic effect of decoration. That is, as shown in FIG. 3, if the length dimension of the upper connection surface 12*g*1 to the back surface of the transparent member 12 is represented by 1L1 and the length dimension of the lower connection surface 12*g*2 to the back surface of the transparent member 12 is represented by 1L2, in a state in which 1L1 is the same or substantially the same as 1L2, the main design surface 12*g*6 is visually recognized to be darkest, and the upper curved surface 12*g*4 and the lower curved surface 12*g*5 located above and below the main design surface 12*g*6 are visually recognized to be bright.

Meanwhile, as shown in FIG. 3, by setting 1L1 to half or approximately half of 1L2, when a viewpoint is above the radar cover 11 in a state in which the radar cover 11 is attached to a vehicle, the main design surface 12*g*6 is visually recognized to be brightest, and the three surfaces including the upper curved surface 12*g*4 and the lower curved surface 12*g*5 have almost the same brightness and recognized as a wide surface. When the viewpoint is gradually lowered from this state and reaches a state of being substantially horizontal with the radar cover 11, only the main design surface 12*g*6 is dark, and the main design surface 12*g*6 is visually recognized as if the main design surface 12*g*6 is edged by the upper curved surface 12*g*4 and the lower curved surface 12*g*5 visually recognized to be bright. In this way, by combining the flat portion and the curved portion even though these portions form one paint layer 14, different designs can appear depending on the position of the viewpoint.

Hitherto, the preferred embodiment of the present invention has been described with reference to the attached drawings, but the present invention is not limited to the above embodiment. The shapes, the combinations, and the like of the respective constituent members described in the above embodiment are merely examples, and various modifications can be made based on design requirement or the like without departing from the gist of the present invention.

For example, in the above embodiment, the configuration in which the lateral recess 12*g* is formed in a part of the mesh-like portion 12*e* has been described. However, the present invention is not limited thereto, and can adopt a configuration having a lateral recess with another shape. For example, it is also possible to adopt a configuration having a lateral recess extending parallel to the horizontal direction.

In the above embodiment, the configuration in which the inner core 15 is housed in the inner core housing recess 12*b* of the transparent member 12 and the inner core 15 is sandwiched between the transparent member 12 and the support member 16 to form the emblem 1E has been described. However, the present invention is not limited thereto. For example, the present invention can be applied to a radar cover having a configuration in which a glittering discontinuous film is directly formed on a front surface of the transparent member 12 or the support member 16 and the inner core 15 is omitted, and a method for manufacturing the radar cover.

In the present embodiment, the extension recess (the longitudinal recess 12*f* and the lateral recess 12*g*) has, a first connection surface disposed on one side in an orthogonal cross section with respect to an extension direction and connected to a back surface of the transparent member 12, a second connection surface disposed on the other side in the orthogonal cross section with respect to the extension direction of the extension recess and connected to the back surface of the transparent member 12, and an intermediate surface connected to each of the first connection surface and the second connection surface and having a main design surface set at a different angle from each of the first connection surface and the second connection surface.

However, if the intermediate surface has, a first curved surface connected to the first connection surface without being bent, a second curved surface connected to the second connection surface without being bent, and a main design surface disposed between the first curved surface and the second curved surface and formed in a flat surface, the outline of the main design surface can be conspicuous. Therefore, even in such an extension recess having only an intermediate surface, it is possible to improve a stereoscopic effect of decoration by making the outline of the main design surface conspicuous.

Second Embodiment

Hereinafter, a radar cover and a method for manufacturing the radar cover according to a second embodiment of the present invention will be described with reference to the drawings. Incidentally, in the following drawings, in order to make each member have a recognizable size, the scale of each member is appropriately changed.

Figure 9:
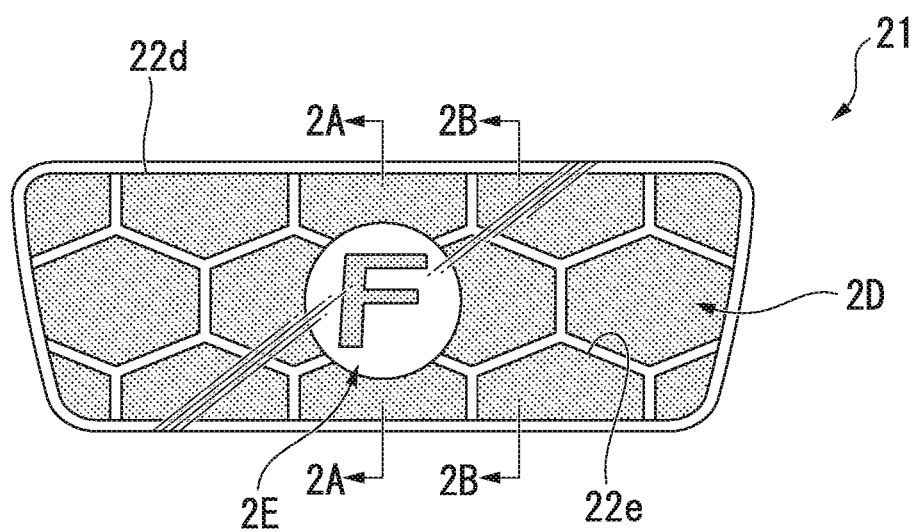
FIG. 9 is a front view schematically showing a radar cover according to a second embodiment of the present invention.
Figure 10A:
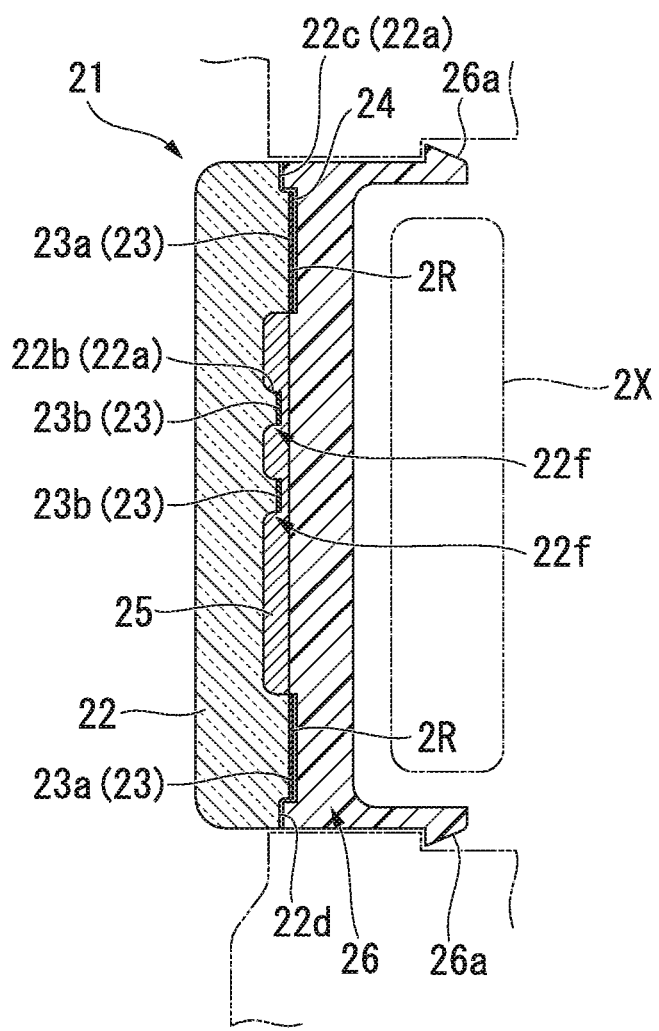
FIG. 10A is a cross-sectional view taken along line 2A-2A of FIG. 9.
Figure 10B:
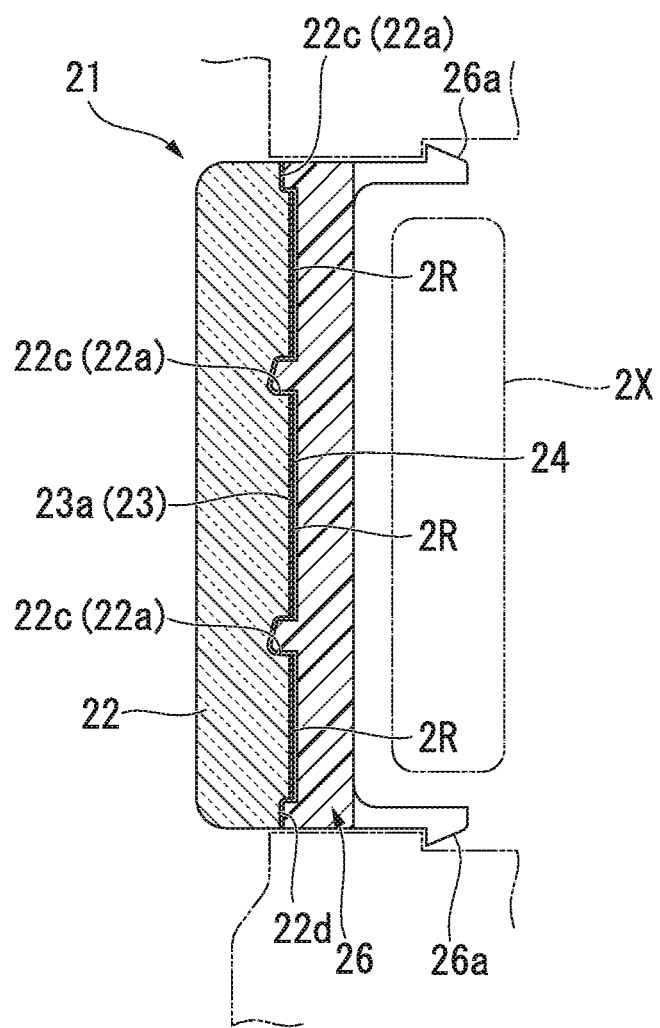
FIG. 10B is a cross-sectional view taken along line 2B-2B of FIG. 9.

FIG. 9 is a front view schematically showing a radar cover 21 of the present embodiment. FIG. 10A is a cross-sectional view taken along line 2A-2A of FIG. 9. FIG. 10B is a cross-sectional view taken along line 2B-2B of FIG. 9. As shown in FIG. 9, the radar cover 21 of the present embodiment has, an emblem 2E disposed at the center, and a mesh-like outer design portion 2D disposed around the emblem 2E. Incidentally, in FIG. 9, a part of the emblem 2E and a part of the outer design portion 2D are shown in white, but the region shown in white is silver in the present embodiment. A region indicated by a dot pattern in the emblem 2E and the outer design portion 2D is black in the present embodiment.

As shown in FIGS. 10A and 10B, the radar cover 21 of the present embodiment is disposed so as to cover a radar unit 2X for detecting a surrounding situation of a vehicle from a front side of the vehicle, and transmits a radio wave used in the radar unit 2X. Such a radar cover 21 of the present embodiment is disposed on a traveling path of a radio wave of the radar unit 2X (in a region through which a radio wave emitted from the radar unit 2X is propagated), and includes, a transparent member 22, a print layer 23 (colored layer), a paint layer 24, an inner core 25, and a support member 26 as shown in FIGS. 10A and 10B. Hereinafter, the up-down direction on the sheet in FIGS. 9, 10A, and 10B is simply referred to as an up-down direction. The up-down direction is the same as the vertical direction when the radar cover 21 is installed in a vehicle.

The transparent member 22 is formed of a transparent resin material and is disposed at the outermost side of a vehicle among constituent members of the radar cover 21. A front surface of the transparent member 22 is formed in a smooth surface in order to enhance visibility of the emblem 2E and the outer design portion 2D as viewed from the outside of the vehicle. On a back surface of the transparent member 22 (a surface on a side of the support member 26), a recess 22a is formed. In the radar cover 21 of the present embodiment, the transparent member 22 includes, as the recess 22a, an inner core housing recess 22b having the inner core 25 housed therein, and a painted recess 22c having the paint layer 24 formed therein by application of a paint to the inner wall surface. A surface of the transparent member 22 on a side of the radar unit 2X is referred to as a back surface, and the surface opposite thereto is referred to as a front surface (front). A side on which a back surface of the transparent member 22 is located may be referred to as a back side, and a side on which a front surface thereof is located may be referred to as a front side. A direction in which the front surface and the back surface of the transparent member 22 face each other, that is, a left-right direction on the sheet in FIGS. 10A and 10B may be referred to as a thickness direction.

The inner core housing recess 22b is formed in a circular shape along the outer shape of the emblem 2E when viewed from the front and is formed at the center of the radar cover 21 on which the emblem 2E is disposed.

Such an inner core housing recess 22b houses the inner core 25 in a state in which the inner core 25 is in contact with the inner wall surface.

The painted recess 22c has, a frame-like portion 22d formed in a frame shape on an outer edge portion of the radar cover 21, and a mesh-like portion 22e formed in a mesh shape inside the frame-like portion 22d, when viewed from the front. In such a painted recess 22c, the paint layer 24 is disposed so as to cover the inner wall surface. A part of the support member 26 enters the painted recess 22c, and the paint layer 24 is covered from the back side by the support member 26.

In the present embodiment, a region in which the recess 22a is not formed on a surface (back surface) of the transparent member 22 on a side of the support member 26 is configured as a print layer forming region 2R where the print layer 23 is formed. The print layer forming region 2R is formed in a flat surface and is covered from a back side of the transparent member 22 by the print layer 23.

FIG. 11 is a schematic enlarged cross-sectional view including a part of the inner core housing recess 22b. As shown in FIG. 11, the transparent member 22 has a protrusion 22f protruding from a bottom portion 22b1 of the inner core housing recess 22b. The protrusion 22f is erected on the bottom 22b1 of the inner core housing recess 22b so as to protrude from a front side (left side in FIG. 11) of the transparent member 22 to a back side (right side in FIG. 11) thereof. A distal end surface 22f1 (end surface on a back side) of the protrusion 22f is formed in a flat surface, and is configured as a print layer forming surface (colored layer forming surface) on which the print layer 23 is formed.

The distal end surface 22f1 of the protrusion 22f is positioned at the front side of the transparent member 22 compared to the print layer forming region 2R which is the back surface of the transparent member 22. That is, a protrusion dimension 2d1 of the bottom 22b1 of the inner core housing recess 22b of the protrusion 22f is set to be smaller than a depth dimension 2d2 of the inner core housing recess 22b.

The distal end surface 22f1 of the protrusion 22f is bent at an angle of approximately 90° and connected to a circumferential surface 22f2 of the protrusion 22f. The circumferential surface 22f2 is a surface substantially facing a direction orthogonal to a thickness direction. That is, a boundary portion between the distal end surface 22f1 of the protrusion 22f and the circumferential surface 22f2 thereof is configured as a so-called pin angle. In other words, the distal end surface 22f1 of the protrusion 22f is connected to the circumferential surface 22f2 of the protrusion 22f such that a connecting portion between the distal end surface 22f1 and the circumferential surface 22f2 is angular. Note that the angle formed by the distal end surface 22f1 of the protrusion 22f and the circumferential surface 22f2 thereof is preferably 90°, but may be about 93° in consideration of a draft during injection molding. That is, the angle formed by the distal end surface 22f1 of the protrusion 22f and the circumferential surface 22f2 thereof may be an obtuse angle.

Such a transparent member 22 is formed of a transparent synthetic resin such as colorless polycarbonate (PC) or a polymethyl methacrylate resin (PMMA), for example, and has a thickness of about 1.5 mm to 10 mm. A front surface of the transparent member 22 is subjected to a hard coat treatment for preventing scratches or a clear coat treatment with a urethane-based paint as necessary. Note that a transparent synthetic resin having scratch resistance does not need to be subjected to the scratch preventing treatment.

The print layer 23 is a thin film layer printed on the print layer forming region 2R of the transparent member 22 and the distal end surface 22f1 of the protrusion 22f, and is black as described above in the present embodiment. The print layer 23 is formed by transferring a black ink onto the print layer forming region 2R or the distal end surface 22f1 of the protrusion 22f and drying the ink. The print layer 23 formed on the print layer forming region 2R (back surface) of the transparent member 22 (hereinafter referred to as an outer print layer 23a) can be formed by putting a black resin ink capable of transmitting a radio wave used in the radar unit 2X on the print layer forming region 2R, for example, by a silk printing method and drying the ink naturally. The print layer 23 formed on the distal end surface 22f1 of the protrusion 22f (hereinafter referred to as an emblem print layer 23b (colored layer)) can be formed by putting a black resin ink capable of transmitting a radio wave used in the radar unit 2X on the distal end surface 22f1 of the protrusion 22f, for example, by a pad printing method and drying the ink naturally.

The outer print layer 23a and the emblem print layer 23b are visually recognizable from the outside through the transparent member 22 and form a region indicated by the dot pattern shown in FIG. 9. For example, the outer print layer 23a forms a portion excluding the mesh-like pattern of the outer design portion 2D. The emblem print layer 23b forms a character portion of "F" of the emblem 2E.

The paint layer 24 is a thin film layer formed by drying a silver paint capable of transmitting a radio wave used in the radar unit 2X and is silver as described above in the present embodiment.

As shown in FIGS. 10A and 10B, the paint layer 24 is disposed on the entire back surface of the transparent member 22 on which the print layer 23 is formed except for a region where the emblem 2E is formed. That is, the paint layer 24 covers a surface of the print layer 23 on a side of the support member 26 except for the region where the emblem 2E is formed. The paint layer 24 can be formed, for example, by applying a paint containing a pearl pigment and drying the paint naturally. Such a paint layer 24 is visually recognizable from the outside through the transparent member 22 and forms a region indicated by white of the outer design portion 2D shown in FIG. 9 in the painted recess 22c.

The inner core 25 has, a base formed of a resin capable of transmitting a radio wave used in the radar unit 2X, and a glittering film formed so as to cover a front surface of the base. Examples of the glittering film include an indium film formed in a discontinuous film having many gaps capable of transmitting a radio wave. Such an indium film can be formed by, for example, a vacuum vapor deposition method or a sputtering method. Note that the inner core 25 may have a transparent top coat layer covering a front surface of the glittering film or an undercoat layer covering a back surface of the glittering film. The inner core 25 has a groove corresponding to the protrusion 22f of the transparent member 22. Such an inner core 25 is fitted and disposed in the inner core housing recess 22b of the transparent member 22 such that the glittering film faces the inner wall surface of the inner core housing recess 22b and furthermore the protrusion 22f is fitted into the groove. Such an inner core 25 is visually recognizable from the outside through the transparent member 22 and forms a region indicated by white of the emblem 2E shown in FIG. 9.

The support member 26 is a part bonded to the back surface of the transparent member 22 and supporting the transparent member 22, and is formed of a black resin material. The support member 26 has an engaging portion 26a protruding toward a side of an engine room of a vehicle. The engaging portion 26a has a claw-shaped distal end portion, and the distal end portion is engaged, for example, with a radiator grill main body. Such a support member 26 is formed of a synthetic resin such as an acrylonitrile/butadiene/styrene copolymer synthetic resin (ABS), an acrylonitrile/ethylene/styrene copolymer synthetic resin (AES), acrylonitrile/styrene/acrylate (ASA), polybutylene terephthalate (PBT), a colored PC, or polyethylene terephthalate (PET), or a composite resin thereof, and has a thickness of about 1.0 mm to 10 mm.

Subsequently, a method for manufacturing the radar cover 21 of the present embodiment will be described with reference to FIGS. 12A to 17B.

Figure 12A:
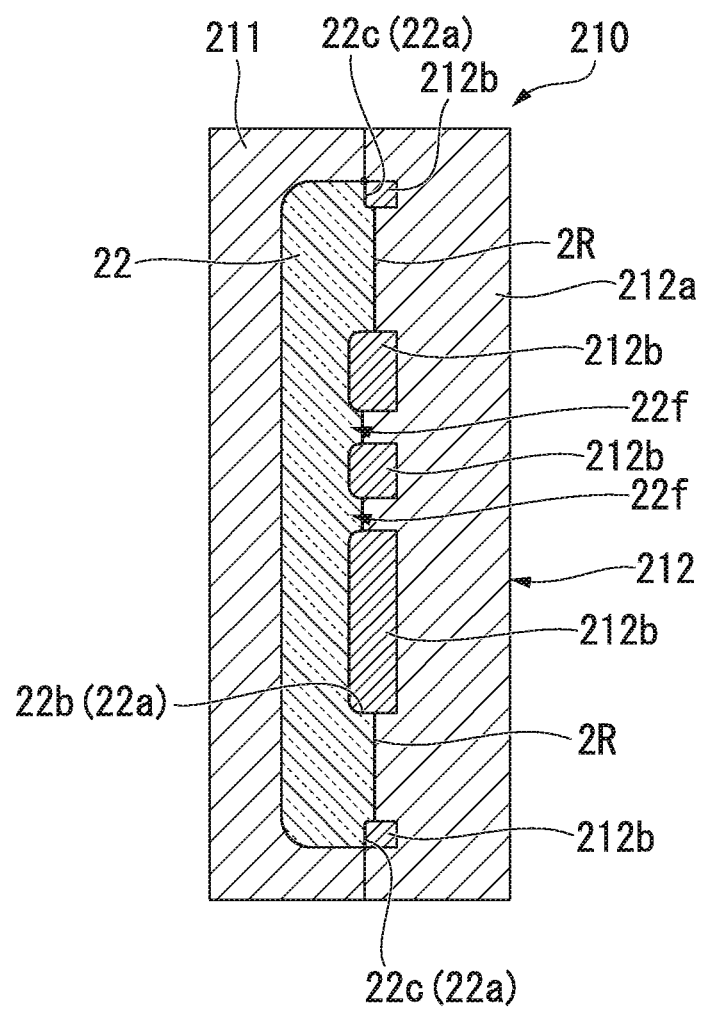
FIG. 12A is a schematic view showing a method for manufacturing the radar cover according to the second embodiment of the present invention.
Figure 12B:
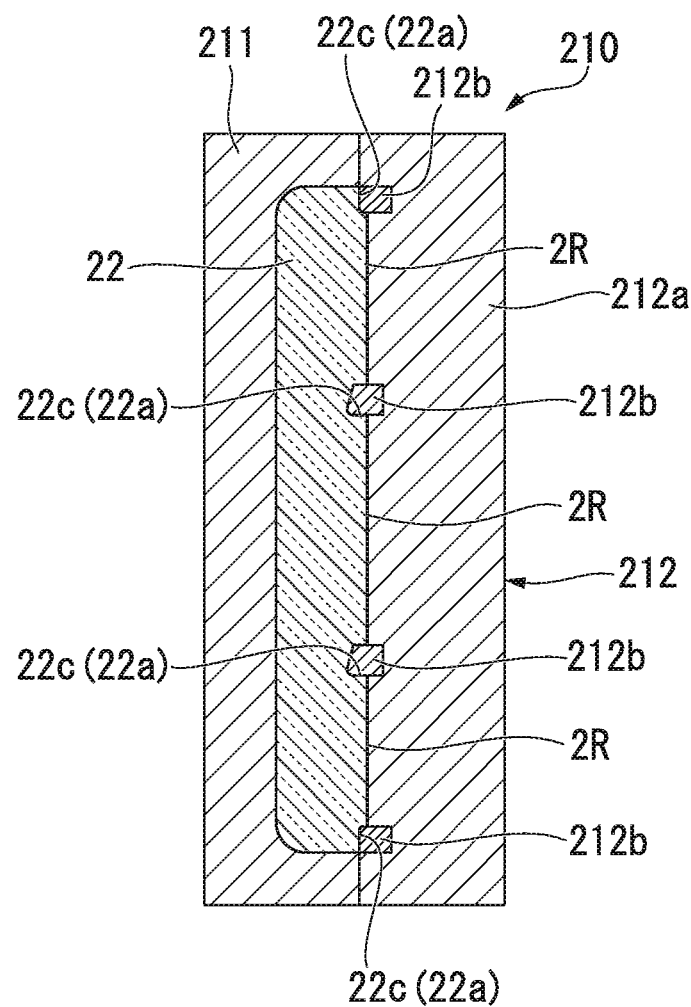
FIG. 12B is a schematic view showing the method for manufacturing the radar cover according to the second embodiment of the present invention.

First, as shown in FIGS. 12A and 12B, the transparent member 22 is formed. Note that FIG. 12A is a cross-sectional view at the same position as FIG. 10A, and FIG. 12B is a cross-sectional view at the same position as FIG. 10B. Here, the transparent member 22 is formed by injection molding using a die 210. The die 210 has a fixed side cavity die 211 and a moving side core die 212. Furthermore, in the present embodiment, the core die 212 has, a base 212a forming the print layer forming region 2R, and a nest 212b for forming the recess 22a. The nest 212b is formed separately from the base 212a of the core die 212 and protrudes from a front surface of the base 212a toward a side of the cavity die 211 in a state of being fixed to the base 212a. By disposing the nest 212b in the core die 212 as described above, a front surface of the base 212a and a front surface of the nest 212b can be bent and connected to each other to form the transparent member 22 in which the distal end surface 22f1 of the protrusion 22f and the circumferential surface 22f2 thereof are bent and connected to each other. That is, it is possible to form the transparent member 22 in which a connecting portion between the distal end surface 22f1 of the protrusion 22f and the circumferential surface 22f2 thereof is angular. Such a step shown in FIGS. 12A and 12B forms the transparent member 22 having the protrusion 22f protruding from the bottom 22b1 of the inner core housing recess 22b and having the distal end surface 22f1 set as a print layer forming surface on which the emblem print layer 23b is formed, corresponding to the transparent member forming step in the present invention.

Figure 13A:
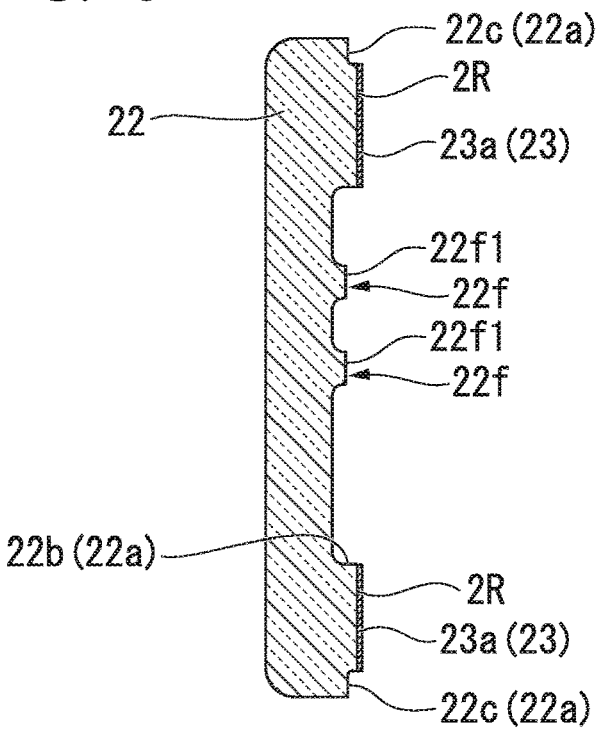
FIG. 13A is a schematic view showing the method for manufacturing the radar cover according to the second embodiment of the present invention.
Figure 13B:
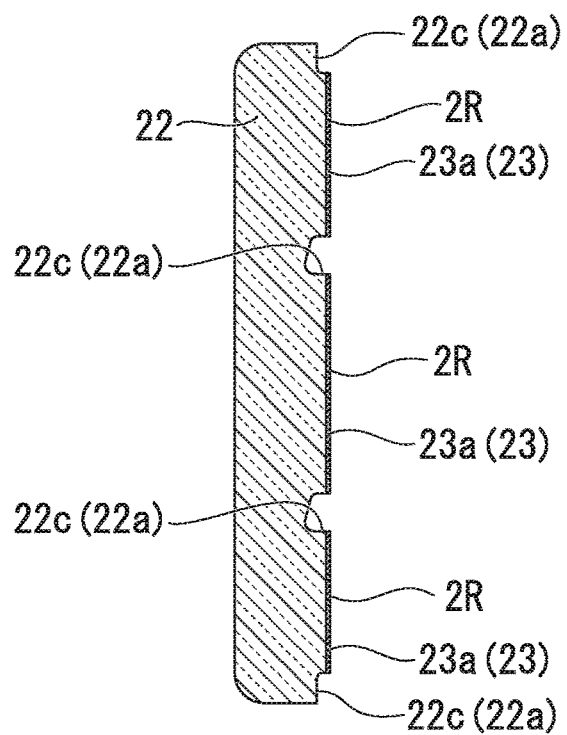
FIG. 13B is a schematic view showing the method for manufacturing the radar cover according to the second embodiment of the present invention.
Figure 14:
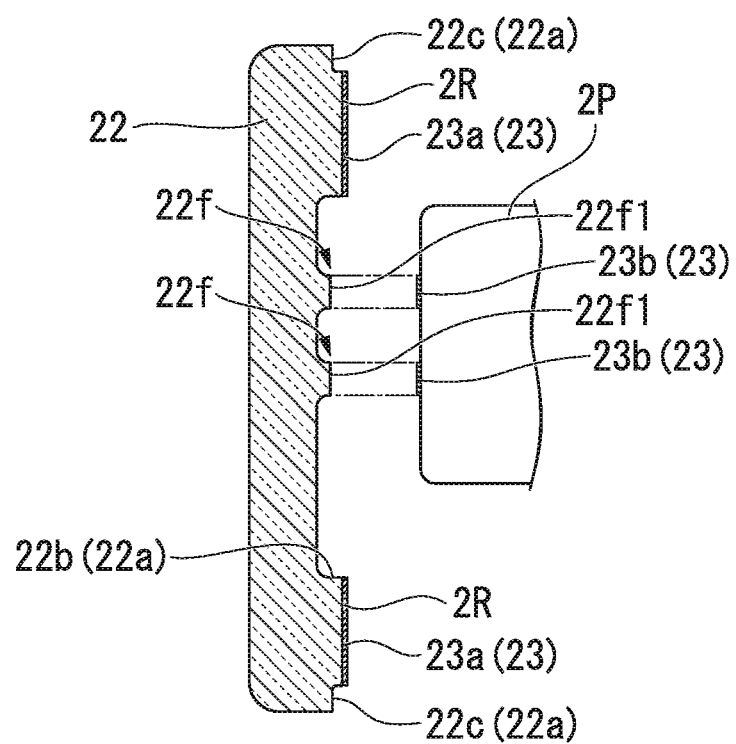
FIG. 14 is a schematic view showing the method for manufacturing the radar cover according to the second embodiment of the present invention.

Subsequently, as shown in FIGS. 13A, 13B, and 14, the print layer 23 is formed. Note that FIGS. 13A and 14 are cross-sectional views at the same position as FIG. 10A, and FIG. 13B is a cross-sectional view at the same position as FIG. 10B. First, as shown in FIGS. 13A and 13B, ink is transferred onto the print layer forming region 2R of the transparent member 22 by a printing method such as a silk printing method, and the ink is dried to form the outer print layer 23a.

Next, as shown in FIG. 14, ink is transferred onto the distal end surface 22f1 of the protrusion 22f by a pad printing method, and the ink is dried to form the emblem print layer 23b.

Here, ink is transferred from a metallic die onto a silicon pad 2P, and furthermore the pad 2P is pressed against the distal end surface 22f1 of the protrusion 22f to transfer the ink onto the distal end surface 22f1. At this time, the area of the ink pressed against the distal end surface 22f1 is desirably slightly larger than the area of the distal end surface 22f1. As a result, the emblem print layer 23b can be reliably formed on the entire distal end surface 22f1. In the present embodiment, the distal end surface 22f1 of the protrusion 22f and the circumferential surface 22f2 thereof are bent and connected to each other. That is, a connecting portion between the distal end surface 22f1 of the protrusion 22f and the circumferential surface 22f2 thereof is angular. Therefore, even when the area of ink pressed against the distal end surface 22f1 is slightly larger than the area of the distal end surface 22f1, it is possible to prevent the ink from flowing around the circumferential surface 22f2. Even if the ink adheres to the circumferential surface 22f2 of the protrusion 22f, the circumferential surface 22f2 is substantially parallel to a visual recognition direction of a viewer from the outside. Therefore, it is difficult to visually recognize the ink adhering to the circumferential surface 22f2. Therefore, it is possible to clarify the outline of the character "F" included in the emblem 2E. Such a step shown in FIG. 14 forms the emblem print layer 23b on the distal end surface 22f1 of the protrusion 22f, corresponding to the colored layer forming step in the present invention.

Figure 15A:
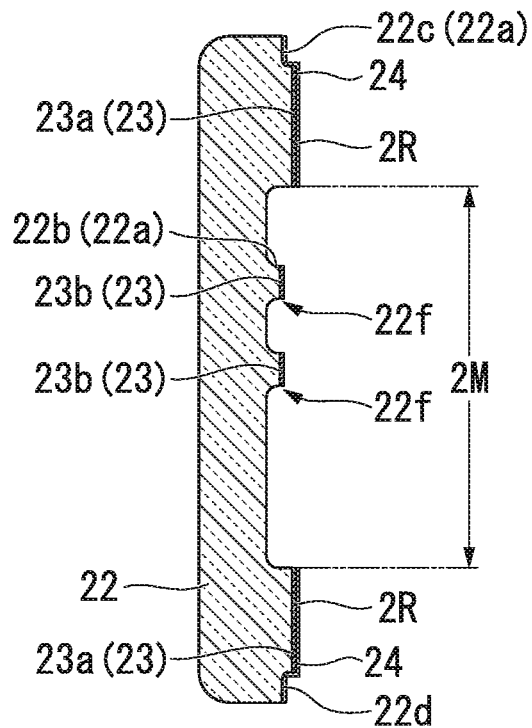
FIG. 15A is a schematic view showing the method for manufacturing the radar cover according to the second embodiment of the present invention.
Figure 15B:
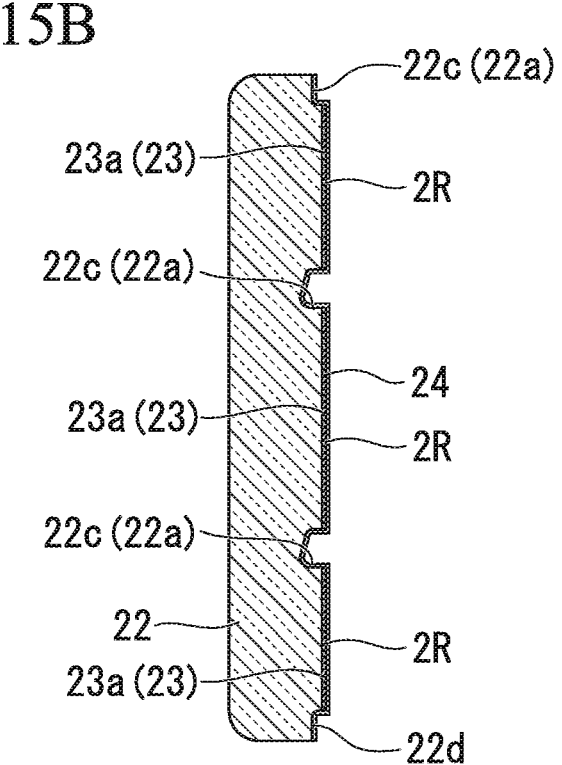
FIG. 15B is a schematic view showing the method for manufacturing the radar cover according to the second embodiment of the present invention.

Subsequently, as shown in FIGS. 15A and 15B, the paint layer 24 is formed. Note that FIG. 15A is a cross-sectional view at the same position as FIG. 10A, and FIG. 15B is a cross-sectional view at the same position as FIG. 10B. Here, in a state in which a region 2M where the emblem 2E shown in FIG. 15A is formed is masked, a silver mica paint is sprayed, for example, on a back side of the transparent member 22 on which the print layer 23 is formed, and the mica paint is dried to form the paint layer 24. In the paint layer 24 thus formed, the paint layer 24 covering the print layer 23 and directly adhering to the inner wall surface of the entire painted recess 22*c* is formed except for the region where the emblem 2E is formed.

Figure 16:
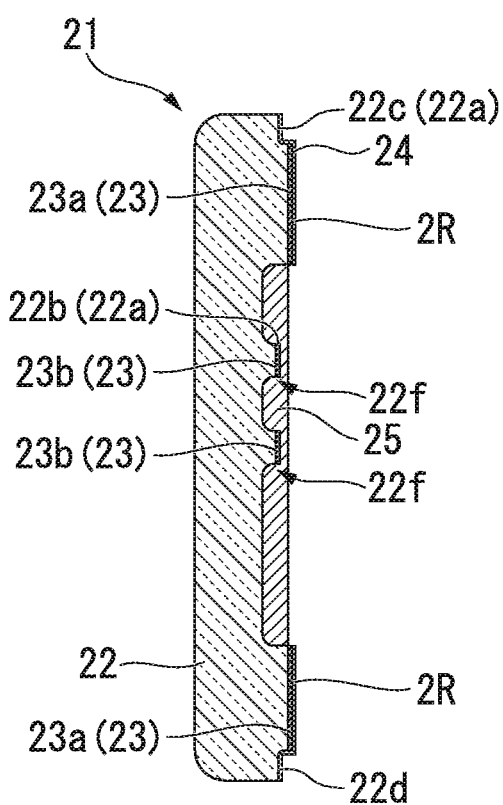
FIG. 16 is a schematic view showing the method for manufacturing the radar cover according to the second embodiment of the present invention.

Subsequently, as shown in FIG. 16, the inner core 25 is housed in the inner core housing recess 22*b*. Note that FIG. 16 is a cross-sectional view at the same position as FIG. 10A. Here, the inner core 25 formed in parallel to formation of the above-described transparent member 22, print layer 23, or paint layer 24 is housed in the inner core housing recess 22*b*. The inner core 25 is formed by forming a glittering discontinuous metal film such as an indium layer on a base formed by injection molding in advance by a vacuum vapor deposition method, a sputtering method, or the like. Note that a topcoat layer or an undercoat layer is formed as necessary in the inner core 25. Such an inner core 25 is housed in the inner core housing recess 22*b* with the glittering discontinuous metal film facing a side of the inner wall surface of the inner core housing recess 22*b*.

Figure 17A:
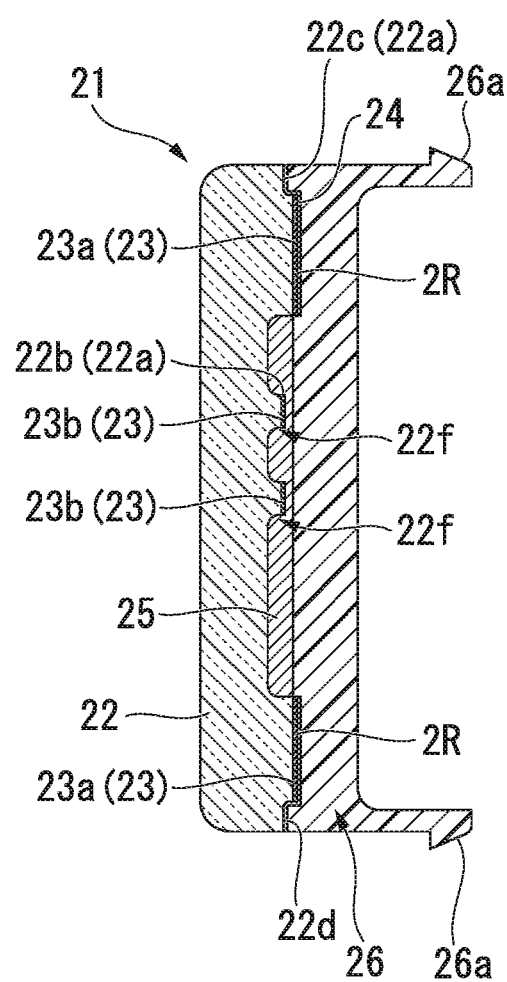
FIG. 17A is a schematic view showing the method for manufacturing the radar cover according to the second embodiment of the present invention.
Figure 17B:
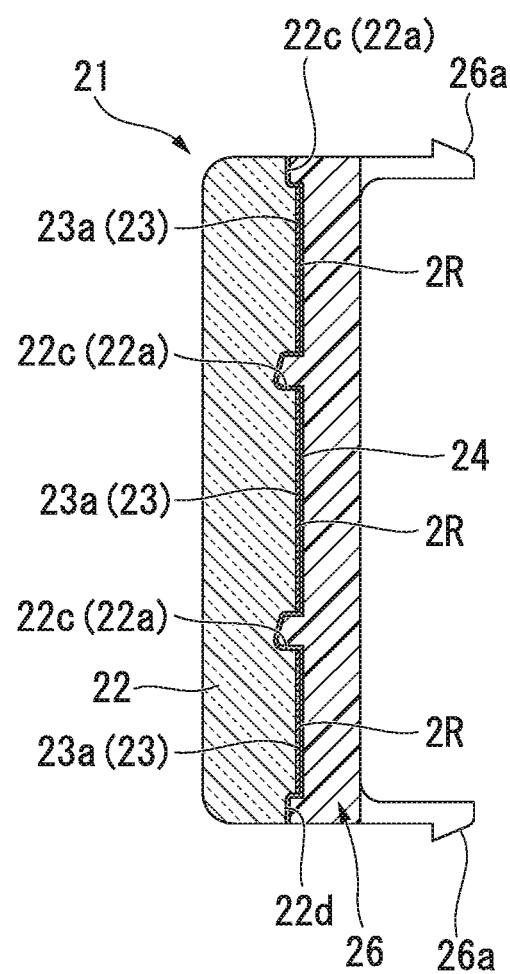
FIG. 17B is a schematic view showing the method for manufacturing the radar cover according to the second embodiment of the present invention.

Subsequently, as shown in FIGS. 17A and 17B, the support member 26 is formed. Note that FIG. 17A is a cross-sectional view at the same position as FIG. 10A, and FIG. 17B is a cross-sectional view at the same position as FIG. 10B. Here, the transparent member 22 having the inner core 25 disposed in the inner core housing recess 22*b* is disposed inside a die for injection molding, and insert molding for emitting a molten resin to the back side of the transparent member 22 is performed to form the support member 26. Such a support member 26 is welded to the transparent member 22 by heat during insert molding and disposed so as to cover the inner core 25. As a result, the inner core 25 is fixed to the transparent member 22. Such a step shown in FIGS. 17A and 17B forms the support member 26, corresponding to the support member forming step in the present invention. Note that the transparent member 22 and the support member 26 may be each individually formed by injection molding or the like, and then the transparent member 22 and the support member 26 may be coupled together using an adhesive, a fastening member, or the like. Even in this case, the support member 26 supports the transparent member 22.

The radar cover 21 and the method for manufacturing the radar cover 21 according to the present embodiment as described above form the protrusion 22*f* protruding from the bottom 22*b*1 of the inner core housing recess 22*b* formed on a back side of the transparent member 22 and having the distal end surface 22*f*1 set as a print layer region on which the emblem print layer 23*b* is formed.

When such an emblem print layer 23*b* formed on the distal end surface 22*f*1 of the protrusion 22*f* is visually recognized from the outside, surroundings of the emblem print layer 23*b* are visually recognized to be brighter or darker than the emblem print layer 23*b*, and the character "F" formed by the emblem print layer 23*b* can have a stereoscopic appearance. Therefore, the radar cover 21 and the method for manufacturing the radar cover 21 according to the present embodiment can impart a stereoscopic effect to a character formed by the emblem print layer 23*b* formed on the inner wall surface of the inner core housing recess 22*b*.

In the radar cover 21 and the method for manufacturing the radar cover 21 according to the present embodiment, the distal end surface 22*f*1 of the protrusion 22*f* and the circumferential surface 22*f*2 thereof are bent and connected to each other. Therefore, even if ink forming the emblem print layer 23*b* adheres to the circumferential surface 22*f*2 of the protrusion 22*f*, the circumferential surface 22*f*2 is substantially parallel to a visual recognition direction of a viewer from the outside. Therefore, it is difficult to visually recognize the ink adhering to the circumferential surface 22*f*2. Therefore, the radar cover 21 and the method for manufacturing the radar cover 21 according to the present embodiment can clarify the outline of the character "F" included in the emblem 2E.

In the radar cover 21 and the method for manufacturing the radar cover 21 according to the present embodiment, the distal end surface 22*f*1 of the protrusion 22*f* is positioned at a front side of the transparent member 22 compared to the print layer forming region 2R which is a back surface of the transparent member 22. As described above, in the radar cover 21 and the method for manufacturing the radar cover 21 according to the present embodiment, it is not necessary to set the distal end surface 22*f*1 of the protrusion 22*f* and the back surface of the transparent member 22 so as to be the same surface. A visual recognition state of the character "F" slightly varies depending on the protrusion dimension 2*d*1 of the protrusion 22*f*. Therefore, according to the present embodiment, regardless of the position of the back surface of the transparent member 22, the distal end surface 22*f*1 of the protrusion 22*f* can be disposed at a position suitable for a stereoscopic effect desired for the character "F".

In the method for manufacturing the radar cover 21 of the present embodiment, the ink forming the emblem print layer 23*b* is transferred onto the distal end surface 22*f*1 of the protrusion 22*f* by a pad printing method. Therefore, the ink can be easily transferred onto the distal end surface 22*f*1 of the protrusion 22*f*.

Hitherto, the preferred embodiment of the present invention has been described with reference to the attached drawings, but the present invention is not limited to the above embodiment. The shapes, the combinations, and the like of the respective constituent members described in the above embodiment are merely examples, and various modifications can be made based on design requirement or the like without departing from the gist of the present invention.

For example, in the above embodiment, the configuration in which the colored layer is the emblem print layer 23*b* has been described. However, the present invention is not limited thereto, and the colored layer can be formed by painting or the like.

In the above embodiment, the configuration in which the transparent member 22 has the inner core housing recess 22*b* and the painted recess 22*c* as the recess 22*a*, and furthermore the painted recess 22*c* has the frame-like portion 22*d* and the mesh-like portion 22*e* has been described. However, the present invention is not limited thereto, and can be applied to a radar cover including a transparent member with a recess having a colored layer formed on an inner wall surface thereof and a method for manufacturing the radar cover.

In the above embodiment, the configuration in which the inner core 25 is housed in the inner core housing recess 22*b* of the transparent member 22 and the inner core 25 is sandwiched between the transparent member 22 and the support member 26 to form the emblem 2E has been described. However, the present invention is not limited thereto. For example, the present invention can be applied to a radar cover having a configuration in which a glittering discontinuous film is directly formed on a front surface of the transparent member 22 or the support member 26 and the inner core 25 is omitted, and a method for manufacturing the radar cover.

DESCRIPTION OF THE REFERENCE SYMBOLS 11, 21: Radar cover
12, 22: Transparent member
12a, 22a: Recess
12b, 22b: Inner core housing recess
12c, 22c: Painted recess
12d, 22d: Frame-like portion
12e, 22e: Mesh-like portion
12f: Longitudinal recess (extension recess)
12g: Lateral recess (extension recess)
12g1: Upper connection surface (first connection surface)
12g2: Lower connection surface (second connection surface)
12g3: Intermediate surface
12g4: Upper curved surface (first curved surface)
12g5: Lower curved surface (second curved surface)
12g6: Main design surface
12h: Upper lateral recess (upper extension recess)
12i: Lower lateral recess (lower extension recess)
13, 23: Print layer
14, 24: Paint layer
15, 25: Inner core
16, 26: Support member
1D, 2D: Outer design portion
1E, 2E: Emblem
1X, 2X: Radar unit
22f: Protrusion
22f1: Distal end surface
22f2: Circumferential surface
23a: Outer print layer
23b: Emblem print layer (colored layer)
R: Print layer forming region

What is claimed is:

1. A radar cover disposed on a path of a radio wave of a radar unit for detecting a surrounding situation of a vehicle, the radar cover comprising: a transparent member; and a support member for supporting a back surface of the transparent member, wherein
the transparent member comprises an extension recess recessed toward a front surface side from the back surface, extending along the back surface, and comprising a paint layer formed on an inner wall surface thereof, and
the inner wall surface of the extension recess comprises:
a first connection surface disposed on a first side in an orthogonal cross section with respect to an extension direction of the extension recess and connected to the back surface;
a second connection surface disposed on a second side in the orthogonal cross section and connected to the back surface; and
an intermediate surface connected to each of the first connection surface and the second connection surface and comprising a main design surface disposed such that a direction in which the main design surface is oriented is different from each of the first connection surface and the second connection surface,
wherein the first connection surface and the second connection surface are parallel, and
wherein a length from the intermediate surface to the back surface in the first connection surface is different from a length from the intermediate surface to the back surface in the second connection surface.

2. The radar cover according to claim 1, comprising a lateral recess configured as the extension recess and extending in a horizontal direction, wherein
the main design surface is a flat surface inclined so as to extend downward toward a front surface side of the transparent member.

3. The radar cover according to claim 1, wherein a region of the main design surface is larger than each of a region of the first connection surface and a region of the second connection surface.

4. The radar cover according to claim 1, comprising:
an upper extension recess configured as the extension recess and disposed above a center of the transparent member in an up-down direction; and
a lower extension recess configured as the extension recess and disposed below the center of the transparent member in the up-down direction.

5. The radar cover according to claim 1, wherein the paint layer is formed of a mica paint comprising mica particles.

6. The radar cover according to claim 1, wherein the intermediate surface comprises:
a first curved surface connected to the first connection surface; and
a second curved surface connected to the second connection surface, and
the main design surface is disposed between the first curved surface and the second curved surface and formed in a flat surface.

7. A radar cover disposed on a path of a radio wave of a radar unit for detecting a surrounding situation of a vehicle, the radar cover comprising:
a transparent member comprising a recess formed on a back surface thereof;
a colored layer formed on an inner wall surface of the recess;
an inner core housed in the recess of the transparent member; and
a support member bonded to the back surface of the transparent member and supporting the transparent member,
wherein the transparent member comprises an inner core housing recess comprising a protrusion protruding from a bottom of the inner core housing recess and c the colored layer formed on a distal end surface thereof,
wherein the inner core comprises a groove into which the protrusion is fitted, and when the inner core is fitted into the protrusion, the inner core is housed in the inner core housing recess such that the protrusion is fitted into the groove, and
wherein in a cross-sectional view, at least a portion of an upper circumferential surface and a portion of a lower circumferential surface of the protrusion are parallel.

8. The radar cover according to claim 7, wherein the distal end surface of the protrusion is connected to a circumferential surface of the protrusion such that a connecting portion of the distal end surface and the circumferential surface has an angle.

9. The radar cover according to claim 7, wherein the distal end surface of the protrusion is positioned at a front surface side of the transparent member compared to the back surface of the transparent member.

10. A method for manufacturing a radar cover disposed on a path of a radio wave of a radar unit for detecting a surrounding situation of a vehicle, wherein the radar cover comprises: a transparent member comprising a recess formed on a back surface thereof; a colored layer formed on an inner wall surface of the recess;

an inner core housed in the recess of the transparent member; and a support member bonded to the back surface of the transparent member and supporting the transparent member, and the method comprises:

a transparent member forming step of forming the transparent member comprising a protrusion protruding from a bottom of the inner core housing recess, in a cross-sectional view, at least a portion of an upper circumferential surface and a portion of a lower circumferential surface of the protrusion are parallel, and comprising the colored layer formed on a distal end surface thereof;

a coloring layer forming step of forming the colored layer on the distal end surface of the protrusion;

an inner core forming step of forming the inner core comprising a groove into which the protrusion is fitted;

an inner core housing step of housing an inner core in the recess such that the protrusion is fitted into the groove; and a support member forming step of forming the support member.

11. The method for manufacturing a radar cover according to claim 10, wherein in the transparent member forming step, the transparent member is formed such that a connecting portion of the distal end surface of the protrusion and a circumferential surface has an angle.

12. The method for manufacturing a radar cover according to claim 10, wherein in the transparent member forming step, the transparent member is formed such that the distal end surface of the protrusion is positioned at a front surface side of the transparent member compared to the back surface of the transparent member.

13. The method for manufacturing a radar cover according to claim 10, wherein in the colored layer forming step, the colored layer is formed on the distal end surface of the protrusion by transferring ink by a pad printing method.

* * * * *